(12) United States Patent
Alstot et al.

(10) Patent No.: US 7,132,759 B2
(45) Date of Patent: Nov. 7, 2006

(54) HYDROCRATIC GENERATOR

(76) Inventors: Gary Alstot, 3099 Cresta Way, Laguna Beach, CA (US) 92651; Warren Finley, 1076 Skyline Dr., Laguna Beach, CA (US) 92651; Anthony T. Jones, 22 Battery St., Suite 401, San Francisco, CA (US) 94111; Edward Pscheidt, 24721 Georgia Sue, Laguna Hills, CA (US) 92653; Geoffrey E. Dolbear, 23050 Aspen Knoll Dr., Diamond Bar, CA (US) 91765

( * ) Notice: Subject to any disclaimer, the term of this patent is extended or adjusted under 35 U.S.C. 154(b) by 0 days.

(21) Appl. No.: 10/777,458

(22) Filed: Feb. 12, 2004

(65) Prior Publication Data

US 2005/0082837 A1 Apr. 21, 2005

Related U.S. Application Data

(63) Continuation-in-part of application No. 10/404,488, filed on Mar. 31, 2003, now abandoned, and a continuation-in-part of application No. 10/357,007, filed on Feb. 3, 2003, which is a continuation of application No. 09/952,564, filed on Sep. 12, 2001, now Pat. No. 6,559,554, which is a continuation-in-part of application No. 09/415,170, filed on Oct. 8, 1999, now Pat. No. 6,313,545.

(60) Provisional application No. 60/141,349, filed on Jun. 28, 1999, provisional application No. 60/123,596, filed on Mar. 10, 1999.

(51) Int. Cl.
*F03D 9/00* (2006.01)

(52) U.S. Cl. .......................................... 290/54; 290/43

(58) Field of Classification Search ................... 290/42, 290/43, 53, 55
See application file for complete search history.

(56) References Cited

U.S. PATENT DOCUMENTS

| | | | | | |
|---|---|---|---|---|---|
| 3,683,627 | A | * | 8/1972 | Girden | 405/52 |
| 3,855,367 | A | * | 12/1974 | Webb | 261/77 |
| 4,051,810 | A | * | 10/1977 | Breit | 119/51.04 |
| 4,135,364 | A | * | 1/1979 | Busick | 60/325 |
| 4,180,980 | A | * | 1/1980 | Marks et al. | 60/398 |
| 4,311,012 | A | * | 1/1982 | Finley | 60/641.7 |
| 4,470,544 | A | * | 9/1984 | Bronicki et al. | 239/2.1 |
| 4,603,553 | A | * | 8/1986 | Ridgway | 60/641.7 |
| 4,947,647 | A | * | 8/1990 | Jensen | 60/659 |
| 5,106,230 | A | * | 4/1992 | Finley | 405/52 |
| 6,313,545 | B1 | * | 11/2001 | Finley et al. | 290/54 |

* cited by examiner

*Primary Examiner*—Nicholas Ponomarenko
(74) *Attorney, Agent, or Firm*—Colin P. Abrahams

(57) ABSTRACT

A mixing apparatus for mixing relatively low salinity fluid with relatively high salinity fluid comprises a housing having an upper end and a lower end, a fluid inlet at or near the lower end, and a fluid outlet at or near the upper end, wherein the relatively high salinity fluid in use enters the housing through the fluid inlet and is discharged from the housing through the fluid outlet. A feed tube is provided and has a first end connectable to a source of relatively low salinity fluid and second end for introducing relatively low salinity fluid to the housing to mix the relatively high salinity fluid with the relatively low salinity fluid to form a fluid mixture. At least one power generator is associated with the housing, and is driven by the mixing of the relatively high salinity fluid with the relatively low salinity fluid.

24 Claims, 22 Drawing Sheets

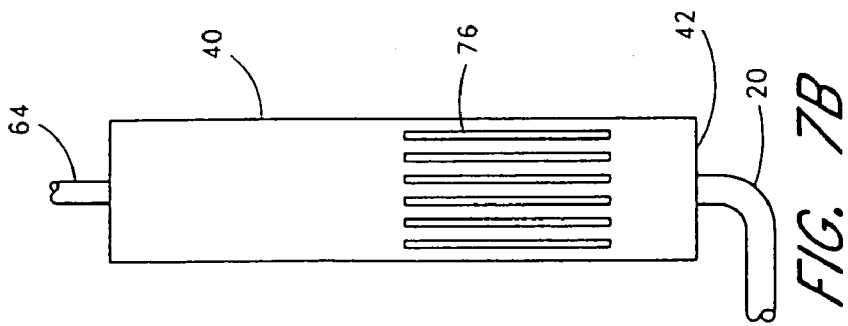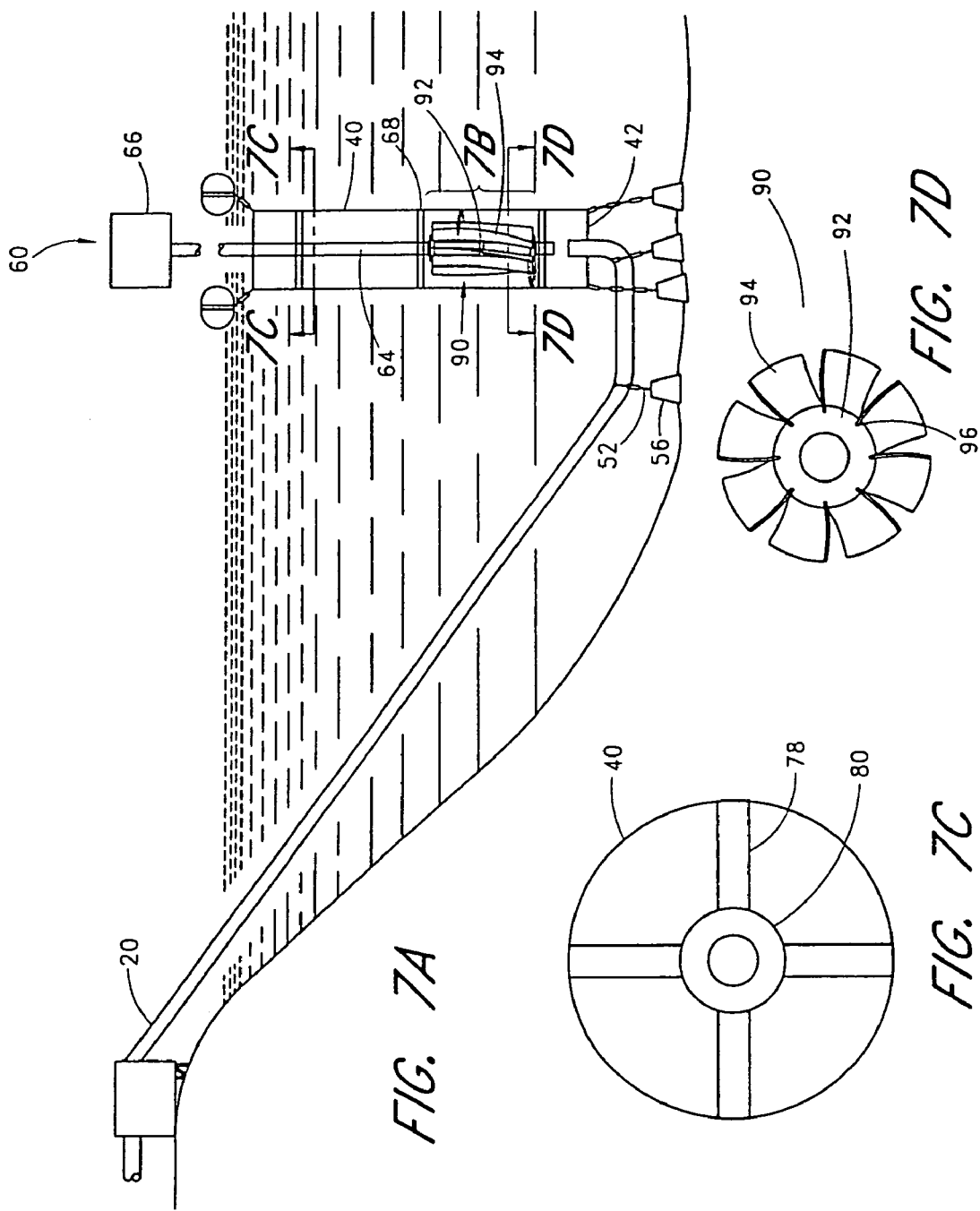

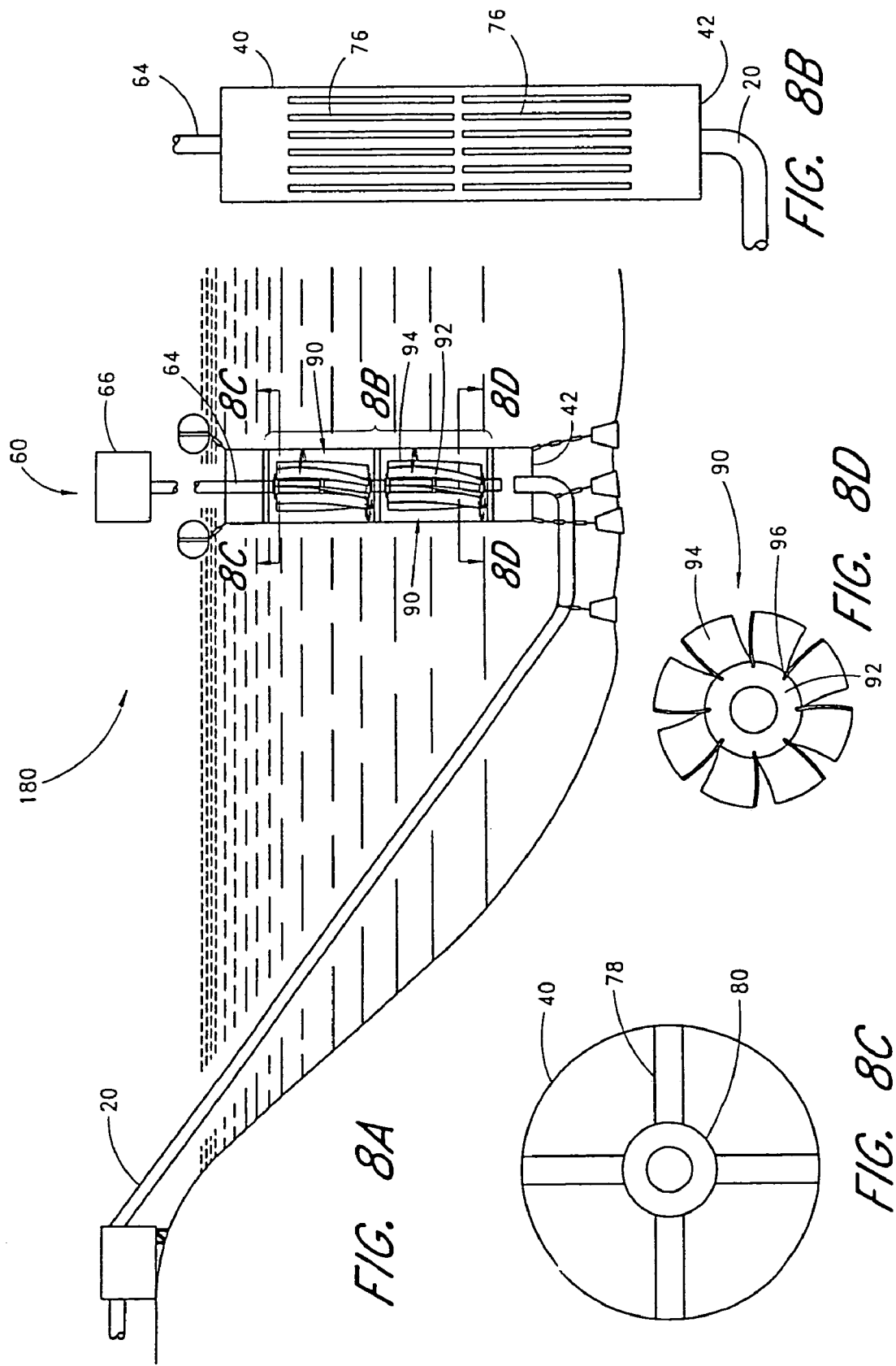

FIG. 21
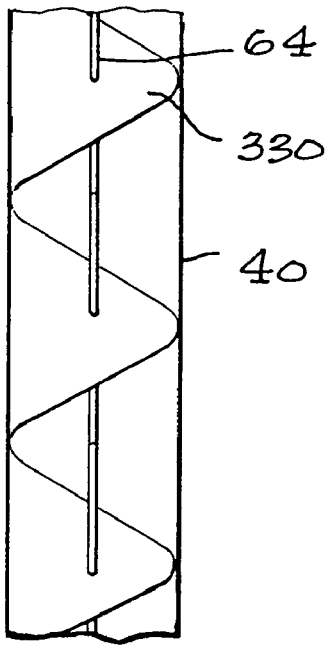
FIG. 22A
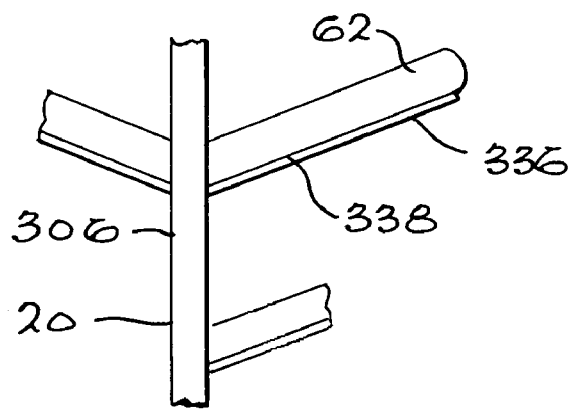
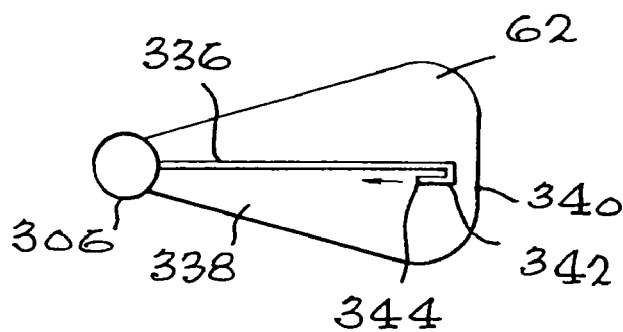
FIG. 22B

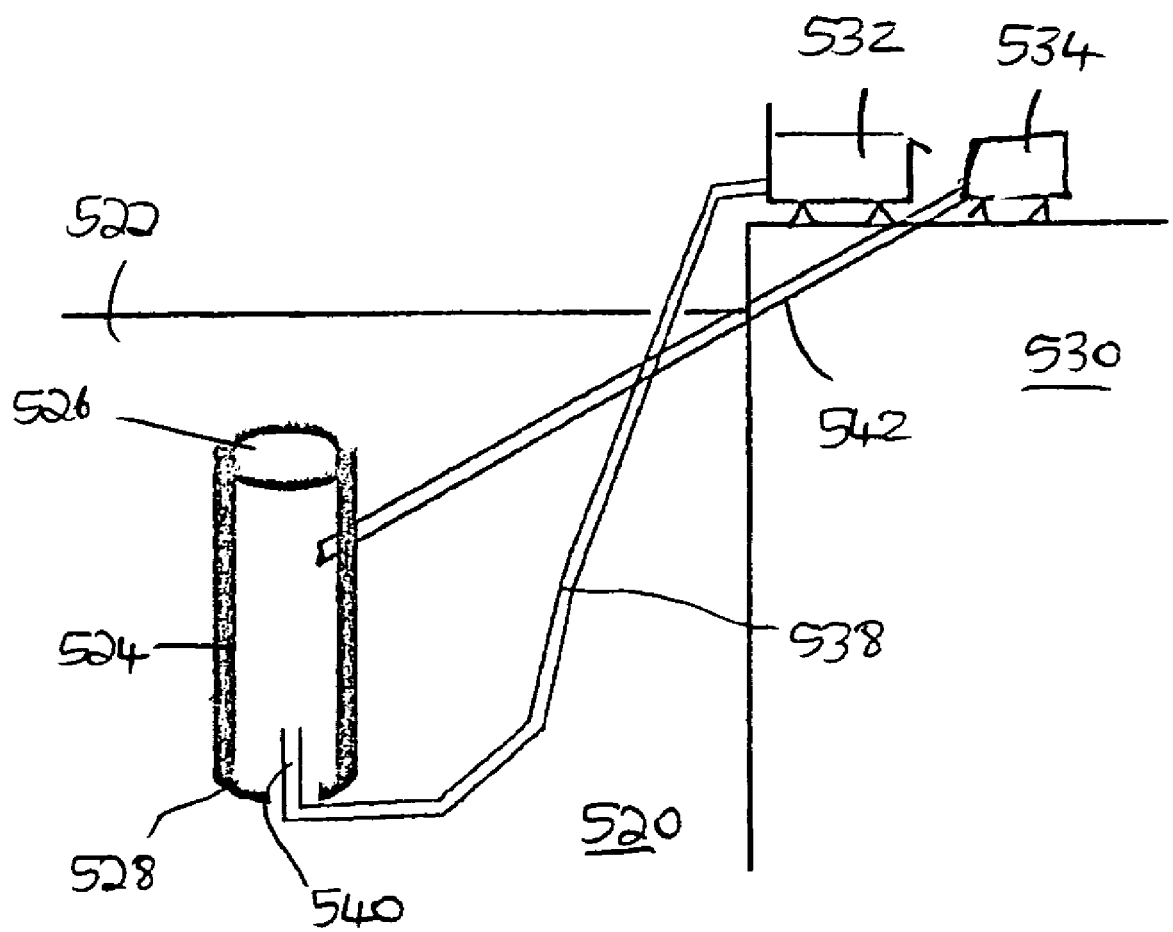

HYDROCRATIC GENERATOR

CROSS REFERENCE TO RELATED APPLICATIONS

This application is a continuation-in-part application of U.S. patent application Ser. No. 10/357,007 filed Feb. 3, 2003 and also a continuation-in-part of U.S. patent application Ser. No. 10/404,488 filed Mar. 31, 2003 now abandoned U.S. patent application Ser. No. 10/357,007 is continuation-in-part of, and U.S. patent application Ser. No. 10/404,488 is a continuation of, U.S. patent application Ser. No. 09/952,564 filed Sep. 12, 2001, now U.S. Pat. No. 6,559,554, which is a continuation-in-part of U.S. patent application Ser. No. 09/415,170 filed Oct. 8, 1999, now U.S. Pat. No. 6,313,545. U.S. patent application Ser. No. 09/415,170 itself claims the benefit of Provisional Patent Applications Nos. 60/123,596 filed Mar. 10, 1999 and 60/141,349 filed Jun. 28, 1999. All of the above applications are incorporated herein by reference.

BACKGROUND OF THE INVENTION

1. Field of the Invention

The present invention relates to hydraulic power generation systems and, in particular, to an apparatus and method for generating power using a novel pseudo-osmosis process which efficiently exploits the osmotic energy potential between two bodies of water having different salinity concentrations.

2. Description of the Related Art

About 20% of the world's electricity is generated using hydropower. In the United States alone this resource accounts for about 12% of the nation's supply of electricity, producing more than 90,000 megawatts of electricity annually and meeting the needs of approximately 28.3 million consumers each year. Hydropower is a clean source of natural energy. Not only is it environmentally friendly (and even beneficial in terms of flood control, etc.), but it is also extremely cost-efficient. In the Northwest, for example, electricity from hydropower plants typically costs about $10 per megawatt hour to produce. This compares to about $60, $45 and $25 per megawatt hour to produce electricity at nuclear, coal and natural gas power plants, respectively.

However, current hydroelectric power plants are configured to recover only the energy component of water that is released as a result of elevational changes. In particular, hydroelectric power is typically generated by dropping 200–300 feet-head (61–91 m-head) of fresh water from a higher elevation to a lower elevation across a rotating turbine coupled to an electrical generator. The exhaust water flow is discharged at the lower elevation as energy-depleted fresh water run-off. But, as will be explained in more detail below, this fresh water run-off is not completely depleted of energy. In fact, the amount of remaining recoverable energy in the discharged fresh water can be as great as the equivalent of 950 feet-head (290 m-head) of water or more. To understand the nature and origin of this additional recoverable energy component it is helpful to look at how fresh water is created.

Fresh water begins as water vapor that is evaporated from the oceans by solar energy. This water vapor rises into the atmosphere whereupon it cools. Cooling causes the water vapors to condense into clouds, ultimately resulting in precipitation. Some of this precipitation occurs over land masses forming fresh-water lakes, accumulated snow-fall and an extensive network of associated rivers, streams, aquifers and other forms of water run-off. Ultimately, all or virtually all of this fresh water run-off makes its way back to the oceans, thus completing the cycle. In fact, throughout the world enormous quantities of fresh water is freely washed into the ocean each year as part of the naturally occurring water cycle and/or as part of various human interventions such as hydro-power facilities, municipal waste water treatment facilities, and the like.

The overall driving force behind the water cycle is solar energy radiating from the sun over millions of square miles of exposed ocean waters each day. It is this solar energy that causes evaporation of fresh water vapors from the relatively high-saline ocean waters. The amount of radiant solar energy absorbed in this process is enormous, representing approximately 2,300 kJ/kg (0.64 kW-hr/kg) of water evaporated. This absorbed energy causes a concomitant increase in the latent energy or enthalpy of the evaporated water. The vast majority of this latent energy (approximately 99%) is dissipated as heat energy into the atmosphere upon re-condensing of the water vapors into clouds. However, a small but significant portion of this latent energy (approximately 0.13%) remains stored within the resulting fresh-water precipitation. This remaining non-dissipated stored energy represents the so-called "free energy of mixing" (or "heat of mixing") of fresh water into sea water. Specifically, it is the additional incremental energy (beyond the energy of evaporation of pure water) that is required to separate the fresh water (or other solvent) from the salt water solution (or other solvent/solute solution).

The free energy of mixing reflects an increase in entropy of water (or other solvent) when it is transformed from its pure (fresh-water) state to its diluted (salt-water) state. It is a physical property of solvents, such as water, that they have a natural tendency to migrate from an area of relatively low solute concentration (lower entropy) to an area of relatively high solute concentration (higher entropy). Thus, an entropy gradient is created whenever two bodies of water or other solvent having differing solute concentrations are brought into contact with one another and begin to mix. This entropy gradient can be physically observed and measured in the well-known phenomena known as osmosis.

Osmosis is the flow of water through a selectively permeable membrane (i.e., permeable to water, but impermeable to dissolved solutes) from a lower concentration of solute to a higher one. It is a colligative phenomenon—that is, it is not dependent on the nature of the solute, only on the total molar concentration of all dissolved species. Pure water is defined as having an osmotic potential of zero. All water-based solutions have varying degrees of negative osmotic potential. Many references discuss osmotic potential in terms of pressure across a semi-permeable membrane since the easiest way to measure the effect is to apply pressure to the side of the membrane with higher negative osmotic potential until the net flow is canceled. "Reverse osmosis" is the phenomena that occurs when additional pressure is applied across a selectively permeable membrane to the point of reversing the natural flow-direction therethrough, resulting in separation of the solvent from the solute.

But, just as it takes energy to separate an amount of fresh water from a body of salt water, such as through solar evaporation or using the well-known reverse-osmosis desalinization process, remixing the fresh water back into the ocean waters results in the release of an equal amount of stored energy (approximately 2.84 kJ/kg) of fresh water. If this source of latent stored energy could somehow be efficiently exploited, it could result in the production of enormous amounts of inexpensive electrical power from a heretofore untapped and continually renewable energy resource.

For example, if 30% of the average flow from the Columbia River could be diverted into a device that recovered this latent free energy of mixing or osmotic energy potential at 100% efficiency, it would generate 6,300 megawatts of power. To put this in perspective, the current hydroelectric facility of the Grand Coulee Dam on the Columbia River (the largest hydroelectric power plant in the United States and the third largest in the world) generates a peak output of 6,800 megawatts. If the flow from the Weber River into the Great Salt Lake could be diverted through such a device, it would generate 400 megawatts of power. Such a device would be of enormous benefit to people throughout the world, particularly those in remote regions where electrical power generation by conventional means may be difficult or impractical.

Various proposals have been made over the years for possible ways of commercially exploiting this attractive source of natural, renewable energy. For example, Jellinek (U.S. Pat. No. 3,978,344) proposed to pass fresh water through a semi-permeable membrane into a salt or brine solution. The resulting osmotic pressure differential across the membrane would then be used to eject a stream of salt water through an outlet orifice to drive a water wheel coupled to an electrical power generator to generate electrical power. Similarly, Loeb (U.S. Pat. No. 3,906,250) describes a method and apparatus for generating power utilizing pressure retarded osmosis through a semi-permeable membrane.

Each of the above approaches, like many others heretofore advocated, rely on a forward osmosis process utilizing a semi-permeable membrane to obtain useful work from the difference in osmotic potential exerted across the membrane. While such systems may have useful application on a small scale under certain limited conditions, full-scale commercial development and exploitation of such power-generation systems is hampered by the large membrane surface area required to achieve adequate flow rates and the expense and difficulty of maintaining such semi-permeable membranes. Although modern advances in synthetic materials have produced membranes that are very efficient at rejecting brine solutes and are tough enough to withstand high pressures, such membranes are still susceptible to clogging, scaling and general degradation over time. For example, river water used as a fresh-water source would likely carry a variety of solutes and other suspended sediment or contaminants which could easily clog the membrane, requiring filtering and/or periodic cleaning. Treated effluent from a municipal waste-water treatment plant used as a fresh water source would present similar and possibly additional complications, making such approach commercially impractical.

Urry (U.S. Pat. No. 5,255,518) proposed an alternative method and apparatus for exploiting osmotic energy potential in a manner that does not utilize a semi-permeable membrane. In particular, Urry proposed the use of a specially formulated bio-elastomer. The bio-elastomer is selected such that it alternately and reversibly contracts or expands when exposed to different concentrations of a brine solution. A mechanical engine is proposed for converting the expansion and contraction motion of individual bio-elastomer elements into useful work. While such a system demonstrates the usefulness of the general approach, the proposed system utilizing bio-elastomer elements or the like is not readily suited for large-scale, low cost energy production. To produce useful energy on a commercial scale such a system would require a vast number of bio-elastic elements having very large surface area. Again, the exposed surface area would be subject to contamination and degradation over time, as with the membranes discussed above, making such a system prohibitively expensive to construct and maintain.

Assaf (U.S. Pat. No. 4,617,800) proposed another alternative apparatus for producing energy from concentrated brine in a manner that does not utilize a semi-permeable membrane or specially formulated bio-elastomer. In particular, Assaf proposed using a system of steam evaporation and re-condensation. In this approach steam is first generated by heating fresh water in an evaporator and passing the steam through a turbine to drive an electric generator. The condensed steam is then passed to a condenser wherein it is contacted with a flow of concentrated brine, generating heat from the heat of dilution of the brine. It is proposed that the evolved heat would then be transmitted though a heat-exchanger element back to the evaporator to generate steam from the fresh water. While this approach generally avoids the membrane and large surface area contamination problems discussed above, it is not ideally suited for large-scale, low cost energy production. This is because of the number and complexity of components involved and the need to heat and cool the fresh water in pressure sealed evaporator and condenser units. Such a system would be expensive to construct and operate on a commercial scale.

Thus, there remains a need for a method and apparatus for efficiently exploiting the osmotic energy potential between fresh water and sea water (and/or other solutions).

SUMMARY OF THE INVENTION

Accordingly, it is an aspect to provide an improved apparatus and method for generating power using a novel forward osmosis process which efficiently exploits the osmotic energy potential between two bodies of water having different salinity concentrations.

Advantageously, the method and apparatus of the present invention does not require the use of a semi-permeable membrane or other specially formulated material, nor does it require heating or cooling of the fresh water or salt water solution. Moreover, the present invention may recover energy from a wide variety of fresh water sources, including treated or untreated river run-off, treated waste-water run-off or effluent, storm-drain run-off, partly contaminated fresh water run-off, and a wide variety of other fresh water sources. Thus, the present invention is well suited to large scale power production in a wide variety of geographic locations and under a wide variety of conditions. The invention has particular advantage for use in remote regions where electrical power generation by conventional means may be commercially infeasible or impractical.

In accordance with one embodiment the present invention provides a method for generating power from the differences in osmotic potential between a source of relatively low salinity water or other fluid and a source of relatively high salinity water or other fluid. Relatively low salinity water is conducted through a first tube. The relatively low salinity water is then directly contacted with the relatively high salinity water in an enclosed second tube to form a mixture. The second tube is in fluid communication with the source of relatively high salinity water through one or more openings. The contacting of the two different salinity waters causes upwelling of the mixture within the second tube. This mixture is passed through a power generation unit to generate mechanical and/or electrical power.

In accordance with another embodiment the present invention provides a method for generating power from the osmotic energy potential of fresh water. A source of relatively low salinity water is conducted to a predetermined depth in a body of relatively high salinity water through a down tube having a first cross-sectional area. The relatively low salinity water is directly contacted with the relatively high salinity water from the predetermined depth in an up tube having a second cross-sectional area, forming a mixture. The mixture is allowed to upwell within the up tube upward to a depth less than the predetermined depth. The upwelling mixture is passed through a power generation unit to generate useful power.

In accordance with another embodiment the present invention provides a system for generating power from differences in osmotic potential between a source of relatively low salinity water and a source of relatively high salinity water. The system comprises an up tube located in the source of relatively high salinity water. The up tube is fluidly connected to the source of relatively high salinity water through one or more openings in the up tube at a first depth. The up tube terminates at a depth in the source of relatively high salinity water at a second depth less than the first depth. A down tube is provided having a first end connected to the source of relatively low salinity water and a second end which discharges the low salinity water from the source of relatively low salinity water into the up tube such that the relatively low salinity water and the relatively high salinity water form a mixture which upwells within the up tube. A means is provided for generating power from the rising mixture.

In accordance with another embodiment, the present invention provides a system for generating power from differences in osmotic potential between a source of relatively low salinity water or other fluid and a source of relatively high salinity water or other fluid. The system comprises a first tube for conducting a flow of relatively high salinity water from a first depth to a second depth, the first tube having a first cross-sectional area. A second tube is provided fluidly connected to the source of relatively low salinity water at a first end and to the first tube at a second end at or near the first depth, where the second tube has a second cross-sectional area. A third tube is provided for conducting a flow of relatively high salinity water from the second depth at or near a first end of the third tube to the first tube at the second end, where the relatively low salinity water and the high salinity water form a mixture in the first tube. The mixture is caused to flow in the first tube, increasing the recoverable energy of the relatively high salinity water in the third tube. A power generator is provided, disposed between the first and third tubes for generating power from the increase in recoverable energy.

In accordance with another embodiment, the present invention provides a method for generating power from the difference in osmotic potential between a source of relatively low salinity water or other fluid and a source of relatively high salinity water or other fluid. A source of relatively low salinity water is conducted through a first tube, where the first tube has a first cross-sectional area. The relatively low salinity water is directly contacted with water from the source of relatively high salinity in an enclosed second tube to form a mixture, where the second tube has a second cross-sectional area. The second tube is in fluid communication with the source of relatively high salinity water through one or more openings in a third tube. The contacting causes an increase in recoverable energy of the relatively low salinity water in the first tube. The relatively high salinity water in the third tube is conducted through a power generation unit to generate mechanical and/or electrical power.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which:

FIG. 7A is a schematic representation of a further alternative embodiment of a hydrocratic generator having features and advantages in accordance with the present invention;

FIG. 7B is a side view of the up tube of FIG. 7A, showing the slots in the side of the up tube;

FIG. 7C is a sectional view from below of the shaft support of FIG. 7A;

FIG. 7D is a sectional view from above of the vane drum of FIG. 7A;

FIG. 8A is a schematic representation of a further alternative embodiment of a hydro-osmotic generator having features and advantages in accordance with the present invention;

FIG. 8B is a side view of the up tube of FIG. 8A showing two sets of slots in the side of the up tube;

FIG. 8C is a sectional view from below of the shaft support of FIG. 8A;

FIG. 8D is a sectional view from above of the vane drum of FIG. 8A;

FIG. 21 is a schematic view of an up tube upwelling apparatus in accordance with the present invention wherein a rotating helical screw is used to generate the power instead of a plurality of fan blades, having features and advantages in accordance with the present invention;

FIG. 22A is a side view of an alternative embodiment of a fan blade used in accordance with the present invention;

FIG. 22B is a schematic view showing the under portion of the fan blade illustrated in FIG. 22A of the drawings;

FIG. 24b is a cross-section through a part of the apparatus as shown in FIG. 24a;

FIG. 27b is a schematic representation showing a cross-section through the device of the invention as shown in FIG. 27a; and FIG. 28 is a schematic representation of yet a further embodiment of the invention used in the context of a power generator using sewage or sanitation effluent and may use a brine line from a water desalinization plant.

DESCRIPTION OF THE PREFERRED EMBODIMENTS

As discussed in the Background section above, when solvent fluids having differing osmotic potentials are contacted and mixed with each other energy is released. This released energy results from an increase in entropy of water (or other solvent) when it is transformed from its pure (fresh-water) state to its diluted (salt-water) state. Thus, an entropy gradient is created whenever two bodies of water or other solvents having differing solute concentrations are brought into contact with one another and begin to mix. This entropy gradient can be physically observed and measured in the well-known phenomena known as osmosis.

Because the term "osmosis" is associated with a membrane, the term "hydrocrasis" is used as a term for the situation when solvent fluids having differing osmotic potentials are contacted and mixed with each other in the absence of a membrane.

Figure 1A:
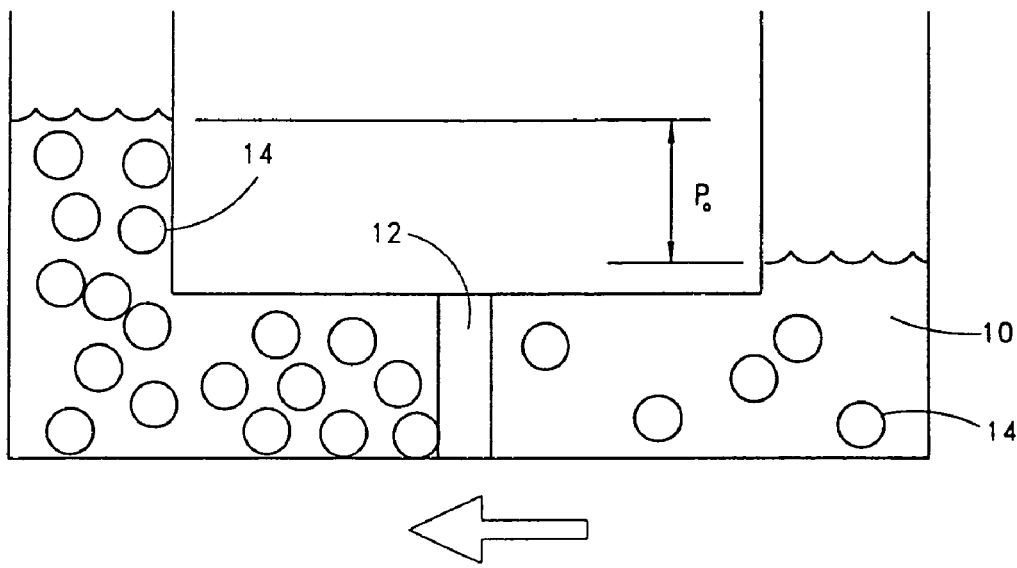
FIG. 1A is a schematic diagram representation of a conventional forward osmosis process through a semi-permeable membrane.

FIG. 1A schematically illustrates conventional forward osmosis through a semi-permeable membrane. Forward osmosis results in the flow of water 10 (or other solvent) through a selectively permeable membrane 12 from a lower concentration of solute 14 to a higher concentration of solute 14. Many references discuss osmotic potential or osmotic pressure in terms of pressure drop Π across a semi-permeable membrane since the easiest way to measure the effect is to measure the difference in height or feet (meters) of head between the high concentration side and the low concentration side of the membrane 12. Forward osmosis results in the release of work energy.

Figure 1B:
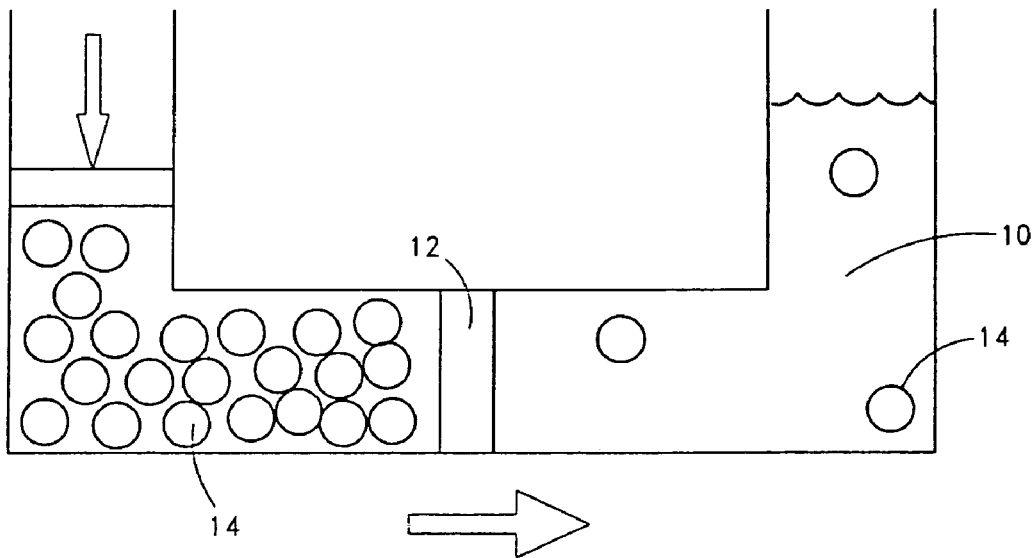
FIG. 1B is a schematic diagram representation of a conventional reverse osmosis process through a semi-permeable membrane.

FIG. 1B illustrates the condition of reverse osmosis whereby water (or other solvent) 10 under the influence of external pressure is forced through a selectively permeable membrane 12 from a higher concentration of solute 14 to a lower concentration of solute 14, thus squeezing out or extracting the pure solvent 10 from the solute 14. Reverse osmosis is widely used in water purification and desalinization plants throughout the world. Reverse osmosis consumes work energy.

To illustrate the amount of work energy dissipated or released in the osmotic process consider a hypothetical example where a large container of salt water is supported just under the surface of a large open container of fresh water. Moreover, there is an osmotic membrane separating the two containers of water. Attached to the vessel of salt water and extending up out of the fresh water is a slender, tall tube with a volume of exactly one cubic meter. This slender, tall tube is open at the top, and this is the only opening to the salt water vessel. At the start of the hypothetical experiment the water level and pressure in both containers is identical and may be at the bottom of the slender, tall tube. However, osmosis will cause the fresh water to flow into the container of salt water through the membrane and raise the level of salt water in the slender tall tube until the pressure exerted by the column of salt water is sufficient to just cancel or oppose the osmotic pressure across the membrane.

Now, if the top of the tube is cut just below the highest level of water therein, then salt water will begin spilling over and dropping from the top of the tube as fresh water continues to flow through the membrane into the salt water solution at an equal rate. Now, for each cubic centimeter of fresh water that flows through the membrane, an equal volume of salt water solution will be displaced from the top of the tube and drop a certain distance. Clearly, work is being done through the mechanism of osmosis, but how much work is being done? How much pressure is exerted by the column of salt water and what is the height of the column?

For small concentrations of an ideal solution, van't Hoff's formula for osmotic pressure ($\Pi$) is:

$$\Pi = -CRT$$

where C=Molar Concentration, R=Gas Constant and T=Absolute temperature. For salt water there are two ions per molecule and:

$$\text{wt (NaCl)} = 58.5 \text{ g}$$
$$T = 20° \text{ C.} = 293° \text{ K.}$$
$$R = 8.3144 \text{ J/mole}° \text{ K.}$$
$$C = 35 \text{ ppt} = 35{,}000 \text{ g/m}^3$$
$$= (35{,}000 \times 2/58.5 \text{ moles})/\text{m}^3$$
$$= 1200 \text{ moles/m}^3$$
$$\Pi = -(1200 \text{ moles/m}^3)(8.3144 \text{ J/mole}° \text{ K.})(293° \text{ K.})$$
$$= -2.9 \times 10^6 \text{ N/m}^2$$
$$= -2.9 \times 10^6 \text{ Pa}$$
$$= -29 \text{ atm.}$$

Pascal's Law says:

$$p = \rho g h$$

Setting p (pressure due to the height of a column of liquid) equal to $\Pi$ (the osmotic pressure) and solving for the height of the column (h) gives:

$$\rho = 1034 \text{ kg/m}^3$$
$$g = 9.8 \text{ m/s}^2$$

-continued $$h = (2.9 \times 10^6 \text{ N/m}^2)/((1034 \text{ kg/m}^3)(9.8 \text{ m/s}^2))$$
$$= 290 \text{ m}$$

The incremental work done to displace 1 kg of water is:

$$W = \frac{1}{2} mgh$$
$$= (0.5)(1 \text{ kg})(9.8 \text{ m/s}^2)(290 \text{ m})$$
$$= 1.4 \text{ kJ}$$

Thus, the osmotic energy potential to be gained from remixing fresh water into saline ocean water is significant—about 1.4 kJ/kg of fresh water, or the equivalent of about 290 m-head of water for a conventional hydropower system. If this source of stored energy could somehow be efficiently exploited, it could result in the production of enormous amounts of inexpensive electrical power from a heretofore untapped and continually renewable energy resource.

Let us now cut the tall tube just below the maximum height of the salt water (290 meters) and attach a spigot. The salt solution would continuously flow out of the spigot. What force is generated when a kilogram of water flows through the tube and falls back to the original water level?

$$W = Mgh$$
$$= (1 \text{ Kg})(9.8 \text{ m/s}^2)(290 \text{ m})$$
$$= 2.8 \times 10^3 \text{ Joules}$$

If the osmotic membrane had a sufficiently large surface area to allow a flow of one kilogram per second, then the system would be generating $1.4 \times 10^3$ Joules per second which is the same as 1.4 Kilowatts.

If a penstock was attached to the end of the spigot and that in turn was attached to a hydroelectric generator placed at the original water level, then that generator (at 100% efficiency) would deliver 1.4 kilowatts of electrical power.

There actually would be no need for either the tall tube or the penstock. The generator would not care if the head pressure was generated by gravity or osmotic pressure. The same electricity would be generated if the opening in the salt water vessel was directly connected to the inlet of the generator.

This is, of course, not a practical system for generating electricity since it relies on an infinitely large rigid vessel and an infinitely large osmotic membrane.

While many systems have been proposed for harnessing this osmotic energy potential, few if any have been commercially successful. One problem is that most osmotic energy recovery systems rely on a conventional forward osmosis process utilizing a semi-permeable membrane. Full-scale commercial development and exploitation of such power-generation systems is hampered by the large membrane surface area required to achieve adequate flow rates and the expense and difficulty of maintaining such semi-permeable membranes. Other systems require the use of exotic bio-elastic materials and/or the use of evaporators, condensers and/or heat exchangers to extract useful work energy from osmotic energy potential.

However, in the unrelated field of ocean mariculture it is known to use the buoyancy effect of fresh water mixed with saline water to provide artificial ocean upwelling for purposes of enriching the waters in the upper photic zone of the ocean with nutrient rich waters from the lower aphotic zones. For example, U.S. Pat. No. 5,106,230, incorporated herein by reference, describes a method for the controlled generation of artificial oceanographic upwelling. The method includes introducing a relatively fresh-water input stream to a predetermined depth, where the fresh-water mixes with the nutrient-rich deep-sea water so as to form a mixture. The mixture is lifted upward by a buoyancy effect brought about by its reduced density, whereby the mixture is conducted towards the surface through an up pipe. The method results in upwelling of cold, nutrient rich water from the lower aphotic regions of the ocean to the upper photic regions where the nutrients may be beneficially used by aquatic sea life.

During recent prototype testing of a similar upwelling device it was discovered, surprisingly, that the amount of upwelling flow achieved in terms of kinetic energy of the overall mass flow was in excess of the input energy into the system in terms of the buoyancy effect and kinetic energy resulting from the fresh water introduced into the up tube. Subsequent experiments using a modified upwelling device have confirmed that the total hydraulic energy output of such system significantly exceeds the total hydraulic energy input.

While an exact explanation for this observed phenomena is not fully appreciated at this time, it is believed that the excess energy output is somehow attributable to the release of osmotic energy potential upon remixing of the fresh water and the salt water in the up tube. This result is particularly surprising since the modified upwelling device incorporated no semi-permeable membrane or other specialized system components heretofore thought necessary to recover such osmotic energy potential. Because no membrane is present, the term hydrocratic generator is applied to the apparatus. For completeness of disclosure and understanding of the invention, the experimental design used in making this discovery is described and discussed below:

Experimental Design

Figure 2:
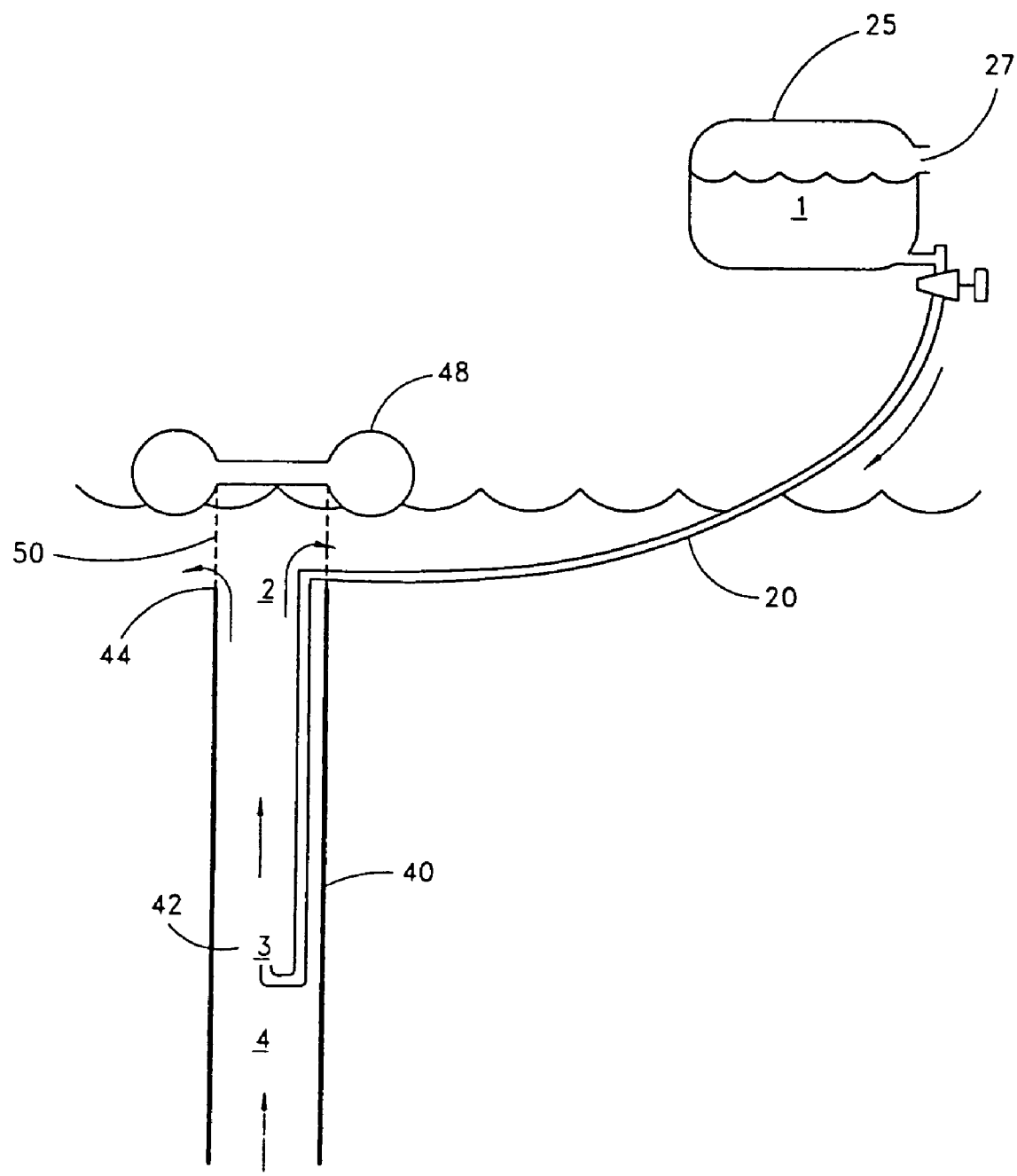
FIG. 2 is a schematic representation of an experimental up tube upwelling apparatus for use in accordance with the present invention.

An experimental upwelling apparatus similar to that illustrated in FIG. 2 was constructed using suitable corrosion resistant materials. The ocean was simulated by dissolving 1800 kilograms (2 tons) of sea salt in a 50,000 liter (15,000 gallon) swimming pool. The up tube 40 was a 15 cm (6 inch) inside diameter (i.d.) polyvinylchloride (PVC) tube 1.5 meters long. In some experiments discussed herein, the top of the up tube 40 was left open and unobstructed, as illustrated. In other experiments discussed herein, a turbine was attached to the top of the up tube 40 to convert kinetic flow energy into mechanical work energy. The down tube 20 was a 1.8 cm (½ inch) i.d. (PVC) tube 1 meter long. Two 90° elbows and a short piece of pipe were attached to the end of the down tube 20 so that the fresh water was caused to exit upwards into the up tube 40 from the down tube 20. The apparatus was attached to a float 48 by nylon support cables 50, and the outlet end 44 of the up tube 40 was positioned about 15 cm below the surface of the salt water.

The down tube 20 was connected to a reservoir 25 of fresh water. The reservoir 25 was kept at a constant level by continually filling with tap water and allowing the excess to flow out the spill-way 27 so that the flow rate of fresh water through the down tube 20 was kept essentially constant. According to measurements the water in the reservoir 25 contained about 300 ppm of dissolved solids at all times, and the salt water in the swimming pool contained between 34,000 and 36,000 ppm of dissolved solids. The temperature of both the water in the reservoir 25 and the salt water was the same in any individual experiment (18–20° C.), because the salt water tank was set into the ground, and the fresh water in the reservoir came from buried pipes.

The experiment was started by filling the down tube 20 with water to eliminate air bubbles. The height of the reservoir was then adjusted to establish a pressure head that determined the rate of flow of fresh water in the down tube 20. The reservoir 25 was then filled with fresh water which was then allowed to flow from the reservoir 25 through the down tube 20 whereupon it was introduced into the lower portion of the up tube 40.

The experiment was monitored by periodically measuring the salinity at the outlet end 44 of the up tube 40 using a Myron L., DS Meter (model 512T5). The flow rate out of the outlet end 44 of the up tube 40 was calculated by measuring the salinity at the outlet end 44 of the up tube 40. In particular, FIG. 2 shows four reference points in the experimental apparatus: Point 1 is the fresh water reservoir; Point 2 is at the outlet end 44 of the up tube 40 where the salinity was measured; Point 3 is immediately above the outlet end 24 of the down tube 20; and Point 4 is inside the up tube 40 below the outlet end 24 of the down tube 20. The following salinities and densities were used in the analysis of the data.

Salinity of Salt Water=35,000 ppm
Salinity of Fresh Water=300 ppm
Density of Salt Water=1.035.

Flow rates were calculated using the following analysis. Since there was a continuous tube from Point 1 to Point 3, the salinity and flow rate must be the same at Points 1 and 3. Since the only inlets to the up tube 40 are from Point 3 and Point 4, the flow at Point 2 must equal the sum of the flows at Point 3 and Point 4. The equation for the flow at Point 4 is derived from the following analysis:

$$\text{If: } Q_i = \text{Flow at point } i$$

$$= W_T/\rho \text{ per second}$$

$$S_i = \text{Salinity at point } i$$

$$= (W_S/W_T)$$

$$W_S = \text{Weight of Salt in a Solution}$$

$$W_T = \text{Total Weight of Solution}$$

$$\rho = \text{Density of Solution}$$

Then:

$$S_2 W_{S2}/W_{T2}$$

And since the flow past Point 2 comes from either Point 3 or Point 4:

$$S_2 = (W_{S3} + W_{S4})/(W_{T3} + W_{T4})$$

Substituting in:

$$W_S = S \ W_T$$

Results in:

$$S_2 = (S_3 W_{T3} + S_4 W_{T4})/(W_{T3} + W_{T4})$$

Substituting in:

$$W_T = Q\rho \text{ seconds}$$

Results in:

$$S_2 = (S_3 Q_3 \rho_3 + S_4 Q_4 \rho_4)/(Q_3 \rho_3 + Q_4 \rho_4)$$

Which gives an equation that has one unknown variable ($Q_4$).

$$Q_4 = Q_3(\rho_3/\rho_4)/(S_2-S_3)/(S_4-S_2)$$

It can be assumed, within the accuracy of this experiment, that:

$$S_3 = 0$$

$$\rho_3 = \rho_4$$

Which leaves:

$$Q_4 = Q_3 S_2/(S_4-S_2)$$

The following Examples 1–4 report the results of several experiments which were conducted using the experimental design described above and as illustrated in FIG. 2:

EXAMPLE 1

The apparatus shown in FIG. 2 was used to measure observed flow rates in the up tube 40 with different fresh water flow rates introduced into the down tube 20. Table 1 is a compilation of the results for flow rates at various points in the up tube 40 with two different flow rates of fresh water in the down tube 20. The flow rate at Point 1, the flow rate of fresh water from the reservoir, and the salinity at Point 2 at the outlet end 44 of the up tube 40 were measured parameters. The flow rate at Point 3, the outlet end 24 of the down tube 20, was the same as the flow rate at Point 1. The remaining flow rates were calculated using the equations discussed above.

TABLE 1

Flow Rates at Various Locations in the Up Tube

| Height of Reservoir (meters) | Salinity at Point 2 (ppt) | Flow ($10^{-4}$ m³/sec) | | | |
|---|---|---|---|---|---|
| | | Point 1 | Point 2 | Point 3 | Point 4 |
| 0.23 | 34 | 1.3 | 45.5 | 1.3 | 44.2 |
| 0.55 | 34 | 2.4 | 84.0 | 2.4 | 81.6 |

The results indicate that the flow rate of the mixed salt-water/fresh-water solution at Point 2 at the outlet end 44 of the up tube 40 far exceeded the flow rate of fresh water at Point 1 and Point 3. Introducing fresh water into the down tube 20 and allowing the salt water to flow into the up tube 40 therefore generated higher flow rates at Point 2, at the top of up tube 40.

In order to demonstrate that this higher flow rate at Point 4 was not due to transfer of kinetic energy from the fresh water flow coming from the down tube 20, the following experiment was performed.

EXAMPLE 2

Flow Rates through the Up Tube with Salt Water vs. Fresh Water Introduced into the Down Tube For this experiment, a 6" turbine roof vent was attached to the outlet end 44 of the up tube 40. One of the vanes was painted to allow for the counting of rotations. The reservoir was filled with fresh water having a salinity of 300 ppm in one experiment and with salt water having a salinity of 36,000 ppm in a second experiment. The reservoir was placed at a height of 0.55 meters above the water level of the salt water in the pool. The fresh water was then allowed to flow through the down tube 20, and the rate at which the turbine rotated was determined. Then, salt water from the salt water pool was allowed to flow through the down tube 20, and the rate at which the turbine rotated was again determined. The results are shown in Table 2 below.

TABLE 2

Turbine Speed with Fresh Water vs. Salt Water in Down Tube

| | Down Tube Water Flow ($10^{-4}$ m³/sec) | Turbine Speed (rpm) |
|---|---|---|
| Fresh Water (0.3 ppt) | 2.4 | 5.6 |
| Salt Water (36 ppt) | 2.3 | 2.3 |

As illustrated in Table 2, above, the turbine rotated 2.4 times more rapidly when fresh water was introduced into the down tube 20 than when salt water was used. The higher turbine speed when fresh water was introduced into the down tube 20 is a direct indication that the water flow in the up tube 40 was higher when fresh water rather than salt water was introduced into the down tube 20 and that the higher observed water flow rates from the top of the up tube 40 in Example 1 were not due solely to kinetic energy transfer from the fresh water flow out of the down tube 20.

The kinetic energy transferred from the salt water in the down tube 20 to the salt water in the up tube 40 would be at least as great (if not slightly greater due to increased density of salt water) as the kinetic energy transferred from the fresh water in the down tube 20. The results shown in Table 2 indicate that some, but not all, of the upwelling of water in the up tube 40 is due to kinetic energy transfer from the water introduced into the down tube 20.

The power which is available from the kinetic energy of the water flow at various locations in the up tube 40 can be calculated as follows:

$$P_k = \text{Power from Kinetic Energy}$$

$$= \frac{1}{2} M_q v^2$$

$$= \frac{1}{2}(\rho Q)(16 Q^2 / \Pi^2 d^4)$$

$$= 8 Q^3 \rho / \Pi^2 d^4$$

where: $A$ = Cross Sectional Area $$= \Pi d/4$$

$d$ = Tube Diameter $M_q$ = Mass Flow $$= Q \times \rho$$

$$\rho = 1 + (S_i/1000)$$

$v$ = Velocity $$= Q/A$$

Table 3 shows the calculated power attributable to kinetic energy at the three points in the up tube 40.

TABLE 3

Kinetic Energy at Various Points in the Up Tube

| Height of Reservoir (meters) | Salinity at Point 2 (ppt) | Kinetic Power (watts) | | |
|---|---|---|---|---|
| | | Point 2 | Point 3 | Point 4 |
| 0.23 | 34 | 0.16 | 0.02 | 0.14 |
| 0.55 | 34 | 0.98 | 0.11 | 0.90 |

In the following series of experiments, the diameter of the down tube 20 and the rate of flow of the fresh water which was introduced into the down tube 20 were varied to determine the dependence of the rate of upwelling in the up tube 40 on these parameters.

EXAMPLE 3

A series of experiments were carried out using the experimental design described above and as illustrated in FIG. 2, but with down tubes 20 having different diameters. With each down tube 20, the flow rates of the fresh water in the down tube 20 were varied to determine the effect of different fresh water flow rates on available power. The salinity at the outlet end 44 of the up tube 40 was measured, and the water flow rates were calculated from the salinity as before. The water flow rates were used to calculate the available power at Point 2, the outlet end 44 of the up tube 40. The available power was then normalized by dividing the available power by the fresh water flow rate in the down tube 20. The results are shown in Table 4 below.

Table 4
Normalized Power Production vs. Diameter of Up Tube and Fresh Water

| | Flow Rates | | | | | |
|---|---|---|---|---|---|---|
| Salinity at Point 2 | Flow (×0.0001 m$^3$) | | | Down Tube | Ratio of Up Tube Area to Down Tube | Power/Fresh Water Flow |
| (ppt) | Point 1 | Point 4 | Point 2 | Area (m$^2$) | Area | (Watts/m$^3$) |
| 31.8 | 22 | 259 | 281 | 0.000254 | 69.7 | 1312 |
| 32.6 | 18 | 309 | 327 | 0.000071 | 249 | 2715 |
| 33.4 | 5.2 | 158 | 163 | 0.000018 | 983 | 1256 |
| 31.4 | 33 | 334 | 367 | 0.000254 | 69.7 | 1877 |
| 32.6 | 26 | 446 | 472 | 0.000071 | 249 | 5664 |
| 33.3 | 7.6 | 211 | 218 | 0.000018 | 983 | 2047 |
| 35.0 | 5 | 168 | 173 | 0.000010 | 1770 | 1559 |

In all cases, the power per unit volume of fresh water introduced into a down tube 20 of a given diameter increased as the flow rate of fresh water through the down tube 20 increased. Thus, for the down tube 20 with an area of 0.000254 m$^2$, the power/m$^3$ of fresh water flow increased from 1312 watts/m$^3$ with a fresh water flow rate of 22×10$^{-4}$ m$^3$ to 1877 watts/m$^3$ with a fresh water flow rate of 33×10$^{-4}$ m$^3$. The same trend was maintained for the down tubes having areas of 0.000071 and 0.000018 m$^2$. Thus, the data illustrates that increasing the fresh water flow rate in a down tube 20 having a given area increased the normalized available power output of the device.

Second, although the power per unit volume of fresh water introduced into the down tube 20 increased with increased volume of fresh water introduced into the down tube 20 in all cases, the percent increase in the power with increase in fresh water flow rate was less for the largest down tube 20 (0.000254 m$^2$ area) than for the other down tubes 20. When the fresh water flow rate increased from 22×10$^{-4}$ m$^3$/sec to 33×10$^{-4}$ m$^3$/sec, or by 50%, with the largest down tube 20, the power/fresh water flow rate increased from 1312 watts/m$^3$ to 1877 watts/m$^3$, or 40%. By comparison, when the fresh water flow rate for the down tube 20 with an area of 0.000018 m$^2$/sec was increased from 5.2 to 7.6×10$^{-4}$ m$^3$/sec, or 46%, the power/fresh water flow rate increased from 1256 watts/m$^3$ to 2047 watts/m$^3$, or 62%, more than 1.5 times as much as for a comparable percent change in the fresh water flow rate with the larger down tube 20.

Similarly, when the fresh water flow rate for the down tube 20 with an area of 0.000071 m$^3$ increased from 18 to 26×10$^{-4}$ m$^3$/sec, or 44%, the power/fresh water flow rate increased from 2715 watts/m$^3$ to 5664 watts/m$^3$ or 108%, more than 2.5 times as much as for the largest down tube 20. The efficiency of power production declined with the largest diameter down tube 20.

Figure 3:
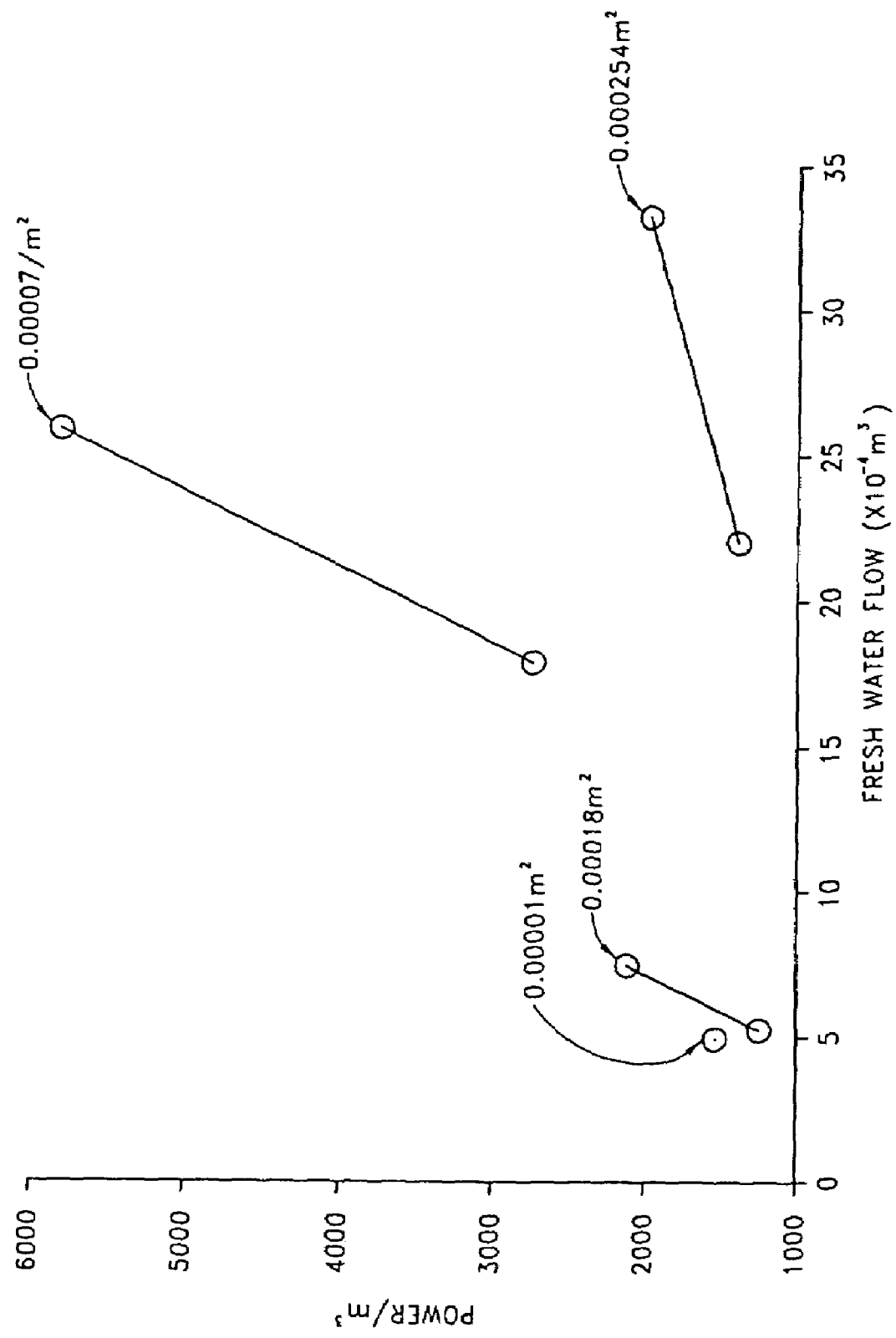
FIG. 3 is a graph of theoretical power recovery for different sized down-tubes and fresh water flow rates using the experimental upwelling device of FIG. 2.

These results are shown graphically in FIG. 3. The graphs depicted therein appear to show that there is an optimum ratio (about 250:1) of the area of the up tube 40 relative to the area of the down tube 20 that maximizes normalized power production. At ratios higher or lower than about 250 the normalized power per unit volume of fresh water declines.

Although a ratio of the area of the up tube 40 relative to the area of the down tube 20 of approximately 250 appears to be optimal, the ratio may range from approximately 5 to 50,000, more preferably from 50 to 2000.

The previous examples and discussions illustrate that a suitably constructed upwelling apparatus as illustrated in FIG. 2 has the potential of generating useful power by mixing aqueous liquids having different osmotic potentials. The simple experimental apparatus illustrated in FIG. 2 generates 0.98 watts with a fresh water flow of 2.4×10$^{-4}$ cubic meters per second. This is equivalent to 4 kilowatts per cubic meter of fresh water per second, indicating an efficiency of about 0.15%. The actual efficiency and capacity of a commercial-scale power production facility will depend on a number of factors, including the size of the up tube, the ratio of the flow area of the fresh water down tube 20 to the flow area of the up tube 40, and the rate of fresh water flow. Those skilled in the art will recognize that the experimental apparatus disclosed and discussed herein-above may be modified and improved in other obvious ways to achieve even greater power production and/or efficiency of operation.

The remaining detailed discussion and corresponding figures illustrate various possible embodiments of a commercial hydrocratic generator utilizing the principles discussed above and having features and advantages in accordance with the present invention. Although the various embodiments of the apparatus depicted and described herein vary somewhat in design and operation, certain common features and advantages will become readily apparent and, thus, the descriptions thereof will not be repeated.

Figure 4:
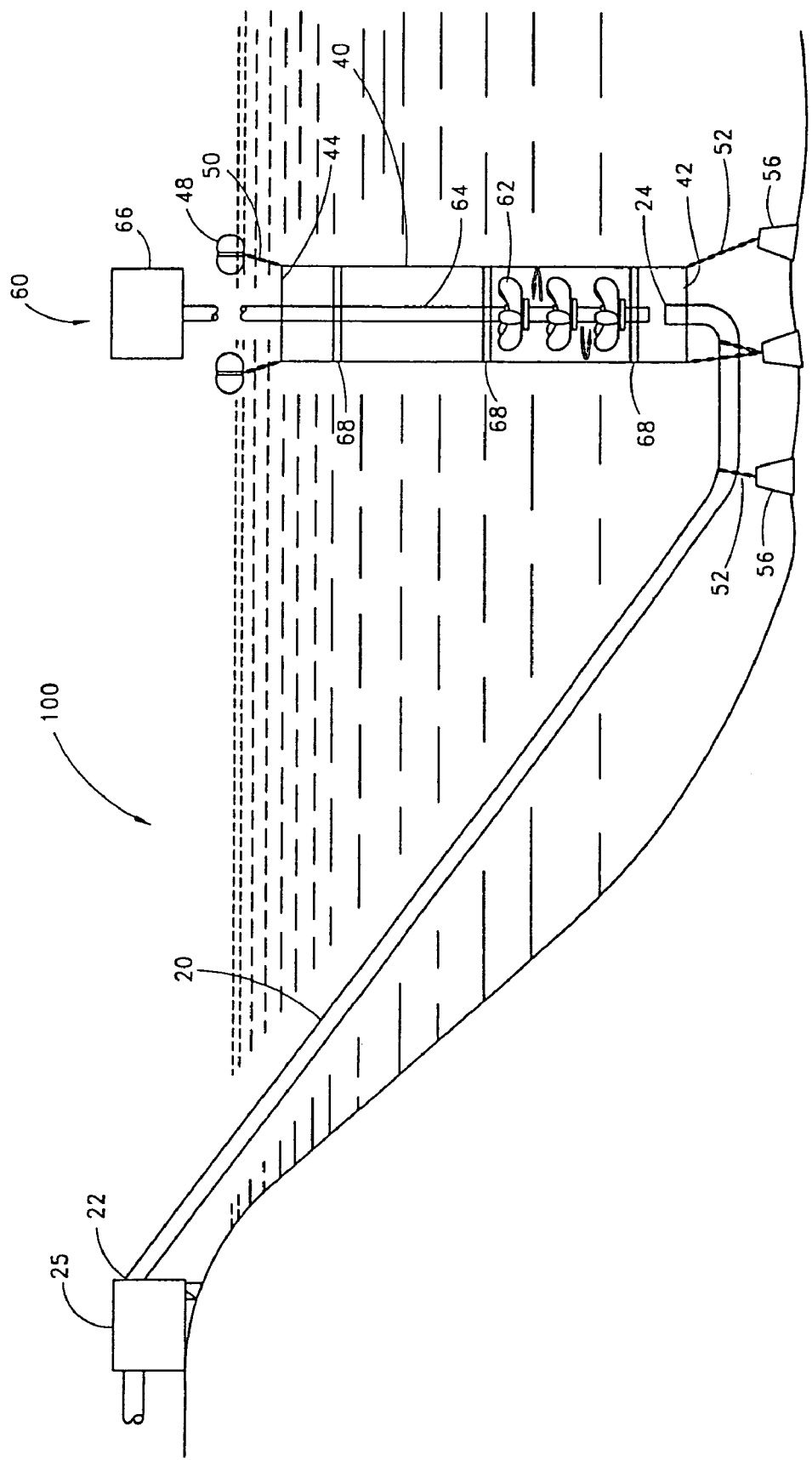
FIG. 4 is a schematic representation of one embodiment of a hydrocratic generator having features and advantages in accordance with the present invention.

FIG. 4 is a simple schematic illustration of one possible embodiment of a hydrocratic generator 100 utilizing the principles discussed above and having features and advantages in accordance with the present invention. The device 100 generally comprises a down tube 20, an up tube 40, and a power plant generator 60. The particular device illustrated in FIG. 4 may be adapted for either large-scale deep water applications or for relatively small-scale or intermediate-scale power generation facilities in shallow coastal waters, as desired. For example, the depth of water illustrated in FIG. 4 may be 10 to 50 meters or more, with the up tube 40 being 1–5 meters in diameter.

In a preferred embodiment, fresh water is introduced into the down tube 20 in order to power the device. The term "fresh" water as used herein is to be interpreted in a broad sense as water having an osmotic potential relative to sea water. Thus, it may be used to describe the input stream a river discharge, a mountain run-off, a treated sewage discharge, a melting iceberg, or even runoff from a city storm drainage system.

The fresh-water input stream may be conducted though the down tube 20 by applying pressure at the inlet end 22 of the down tube 20. The pressure may be provided by a pumping station or with a hydrostatic head pressure resulting from a fluid reservoir at a higher elevation. The pressure applied at the inlet end 22 of the down tube 20 need only be high enough to overcome the hydrostatic head at the outlet end 24 of the down tube 20.

It has been found that, when fresh water is introduced into the down tube 20, sea water flows into the up tube 40, causing upwelling in the up tube 40 that can be used to generate power with the power generator 60. Some of this upwelling effect is due to the increased buoyancy of the mixed water in the up tube 20, because fresh water has a lower density than sea water. However, far more upwelling of sea water is observed than would be expected from this phenomenon alone. It is believed that the apparatus and the method is able to harness the energy available from the different osmotic potentials of fresh water and sea water. The amount of upwelling and the amount of power that is generated in the device depend in part on the particular dimensions of the up tube 40 and the down tube 20 and the flow rate of fresh water in the down tube 20.

As shown in FIG. 4, the down tube 20 has an inlet end 22 and an outlet end 24. The inlet end 22 is connected to a supply 25 of relatively fresh water. For example, this fresh water supply 25 may comprise a reservoir, pump or other source as desired or expedient. The outlet end 24 of the down tube 20 is open such that the fresh water discharges through the outlet end 24 of the down tube 20 into the up tube 40. In alternative embodiments the outlet end 24 of the down tube 20 may be connected to an intermediate mixing chamber (not shown) which then discharges into the up tube 40.

Although the down tube 20 may be any of a variety of diameters, one criterion is to choose a diameter for the down tube 20 which minimizes the resistance to fluid flow through the down tube 20. Resistance to flow through a tube decreases as the diameter of the tube increases. Choosing a large diameter for the down tube 20 therefore minimizes the resistance of the tube for a given flow rate.

Another criterion in choosing the diameter of the down tube 20 is to maximize the amount and efficiency of power generated by the power generator 60. When the diameter of the down tube 20 exceeds a certain value relative to the up tube 40, it has been discovered that the efficiency of power generation declines as the diameter of the down tube 20 is increased further. There is therefore an optimum in the ratio of the diameter of the down tube 20 relative to the diameter of the up tube 40, and therefore the ratio of the area of the down tube 20 relative to the area up tube 40, in order to maximize the efficiency of power generation. When the ratio of the area of the down tube 20 to the up tube 40 increases beyond the optimal value, the increase in efficiency of power generation with increased fresh water flow in the down tube 20 is less than with a down tube 20 having a smaller area relative to the up tube 40 area. Choosing the diameter of the down tube 20 to maximize power production therefore involves tradeoffs to choose the maximum diameter possible without losing power efficiency.

In the embodiment of the apparatus shown in FIG. 4, the outlet end 24 of the down tube 20 is located inside the up tube 40. In this embodiment, the outlet end 24 of the down tube 20 is preferably oriented so that the outlet end 24 of the down tube 20 points upward.

The up tube 40 has an lower end 42 and an outlet end 44. In the embodiment of FIG. 4 both the lower end 42 and the outlet end 44 of the up tube 40 are open. In other embodiments, the lower end 42 of the up tube 40 may contain vanes or other means of directing water flow. Some of these alternative embodiments of the up tube 40 are illustrated in other figures herein.

Although the diameters of the lower end 42 and the outlet end 44 of the embodiment of the up tube 40 shown in FIG. 4 are equal, the lower end 42 and the outlet end 44 of the up tube 40 may have different diameters in other embodiments. For example, the up tube may be positively or negatively tapered to form a nozzle or diffuser. Alternatively, the up tube 40 can have a necked-down portion to form an accelerated flow there-through.

In the embodiment of FIG. 4 the outlet end 44 of the up tube 40 is attached to a flotation system for locating the up tube 40 at a predetermined depth. Other means of locating the up tube 40 at a predetermined depth may also used in place of the flotation system, and the invention is not limited to the embodiment shown in FIG. 4. The flotation system shown in FIG. 4 comprises one or more floats 48 and one or more support cables 50. The float 48 may be formed of Styrofoam, or it may comprise a plurality of individual air bags, drums, or any other suitable material capable of producing buoyancy.

In some embodiments, the lower end 42 of the up tube 40 is attached to mooring cables 52. The mooring cables 52 extend from the lower end 42 of the up tube 40 to anchors 56 fixed on the sea floor. The mooring cables 52 and the anchors 56 retain the up tube 40 in a predetermined location on the sea floor. The lifting force of the float 48 transmitted through support cables 50 retains the up tube 40 at a desired predetermined vertical orientation.

In the embodiment shown in FIG. 4, the down tube 20 is also attached to mooring cables 52 which extend to anchors 56 on the ocean floor. The mooring cables 52 and anchors 56 hold the down tube 20 in place. The down tube 20 is arranged so that it discharges the fresh water into the up tube 40.

Just as choosing an optimal diameter for the down tube 20 involves tradeoffs, choosing the diameter of the up tube 40 also involves optimization. Increasing the diameter of the up tube 40 increases the amount of upwelling in the up tube 40 and therefore increases power production. However, increasing the diameter of the up tube 40 increases both the size and the cost of the apparatus. Further, increasing the area of the up tube 40 allows the use of a down tube 20 with a greater area without losing efficiency in generating power. The ratio of the area of the down tube 20 to the area of the up tube 40 is therefore the parameter which is to be optimized rather than the diameter of either the up tube 40 or the down tube 20 alone The optimal diameters for the up tube 40 and the down tube 20 are interdependent on one another, because the ratio of the areas of the two tubes is a more important parameter in optimizing power production than the area, and therefore the diameter, or either the up tube 40 or the down tube 20 alone.

Advantageously the down tube 20 and the up tube 40 are not subjected to excessively high pressures. In the embodiment shown in FIG. 4, the up tube 40 contains the sea water entering from the lower end 42 of the up tube 40 and the fresh water coming out of the outlet end 24 of the down tube 20. Because the up tube 40 is operated at low pressures, the up tube 40 can be constructed of relatively inexpensive and lightweight materials such as plastic, PVC, lightweight concrete, and the like.

Although the down tube 20 is subjected to higher pressures than the up tube 40, the pressures in the down tube 20 are typically small. Thus, inexpensive materials can therefore generally be used for both the up tube 40 and the down tube 20. Suitable materials for constructing the down tube 20 and the up tube 40 include, but are not limited to, polyvinyl chloride (PVC), fiberglass, polyethylene (PE), polypropylene (PP), concrete, gunite, and the like. Alternatively, other materials such as stainless steel or titanium may also be used. Because the up tube 20 and the down tube 40 are generally exposed to water of relatively high salinity, it is preferable to form the down tube 20 and the up tube 40 from materials which are resistant to corrosion from salt water. Although the materials listed above are, in general, resistant to corrosion, some alloys of stainless steel are not suitable for extended use in salt water. If stainless steel is chosen as a material of construction, it is preferable to select an alloy of stainless steel which is resistant to corrosion by salt water.

The outlet end 44 of the up tube 40 may extend to or above the surface of the sea or may be located at any depth beneath the surface of the sea. In one embodiment, the outlet end 44 of the up tube 40 is located in the photic zone so as to bring nutrient-rich deep-sea water to the photic zone to enhance growth of the organisms in the photic zone through mariculture.

The length of the up tube 40 may vary, depending on a variety of factors. The length of the up tube is preferably sufficient to allow complete mixing of the fresh water with the salt water, but not so long as to cause unnecessary drag on the water flow. The optimal length will be determined as that which allows maximum output flow rate and power production for a given range of input fresh-water flow rates. The length of the up tube 40 may also be chosen based on a desire to facilitate mariculture, the promotion of growth of organisms in the sea by transfer of nutrients from nutrient-rich depths to the nutrient-poor water at lesser depths. If mariculture is practiced, the lower end 42 of the up tube 40 is preferably located at a depth of the sea where large concentrations of nutrients are available, and the outlet end 44 of the up tube 40 is preferably located in the photic zone. In this embodiment, the up tube 40 carries nutrient-rich water from the depth of the lower end 42 of the up tube 40 to the outlet end 44 of the up tube 40 in the photic zone, where few nutrients are available, thereby enhancing growth of the organisms in the photic zone. The length of the down tube 20 is relatively unimportant, provided that it is long enough to deliver the fresh water into the up tube.

The power generator 60 generates electricity from the water flow inside the up tube 40. FIG. 4 shows one simplified form of a power generator 60 suitable for use with the present invention. The power generator 60 comprises one or more turbines or propellers 62 attached to a shaft 64. In a preferred embodiment, there are a plurality of propellers 62 attached to the shaft 64. The shaft 64 is connected to an electrical generator 66. When water upwells in the up tube 40, the upwelling water turns the propellers 62, which in turn rotate the shaft 64. The rotating shaft 64 drives the electrical generator 66, thereby generating power.

Preferably, one or more shaft supports 68 are provided to support the shaft 64 to minimize wobbling of the shaft 64 while the upwelling water turns the one or more propellers 62 attached to the shaft 64. In a preferred embodiment, a plurality of shaft supports 68 engage the shaft 64 to support the shaft 64 to minimize wobbling. In the embodiment shown in FIG. 4, three shaft supports 68 are present to support the shaft 64, a lower shaft support 68, a middle shaft support 68, and an upper shaft support 68. Further details on the shaft supports 68 are given in FIG. 7C, described later.

The propellers 62 on the shaft 64 may be inside the up tube 40, above the outlet end 44 of the up tube 40, or both inside the up tube 40 and above the outlet end 44 of the up tube 40. The propellers 62 on the shaft 64 may be located above the middle shaft support 68, below the middle shaft support 68, or both above and below the middle shaft support 68. In the embodiment of FIG. 4, the propellers 62 are located inside the up tube 40 below the middle shaft support 68. Similarly, the electrical generator 66 may be conveniently located above or below the surface of the water in which the up tube 40 is located. In the embodiment shown in FIG. 4, the electrical generator 66 is located above the surface of the water in order to minimize maintenance expense.

Figure 5:
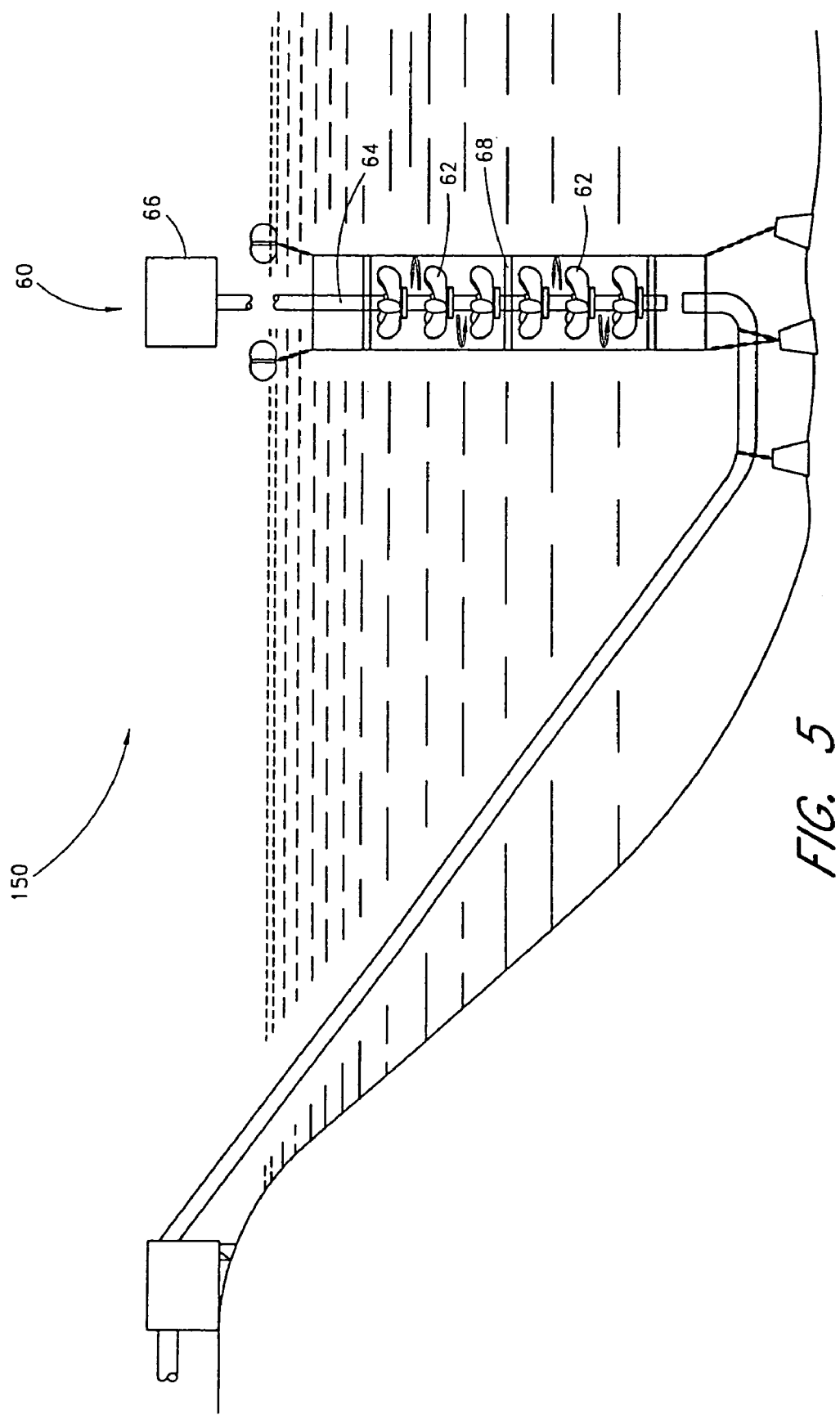
FIG. 5 is a schematic representation of an alternative embodiment of a hydrocratic generator having features and advantages in accordance with the present invention.

FIG. 5 shows an alternative embodiment of a power generator 60. In this case, the power generator 60 comprises propellers 62 attached to the shaft 64 both above and below the middle shaft support 68. The shaft 64 is attached to the electrical generator 66, which generates electrical power when the shaft 64 rotates due to the water flow in the up tube 40. Again, the electrical generator 66 of FIG. 5 is located above the surface of the water. In alternative embodiments, the electrical generator 66 may be located below the surface of the water, if desired.

Figure 6:
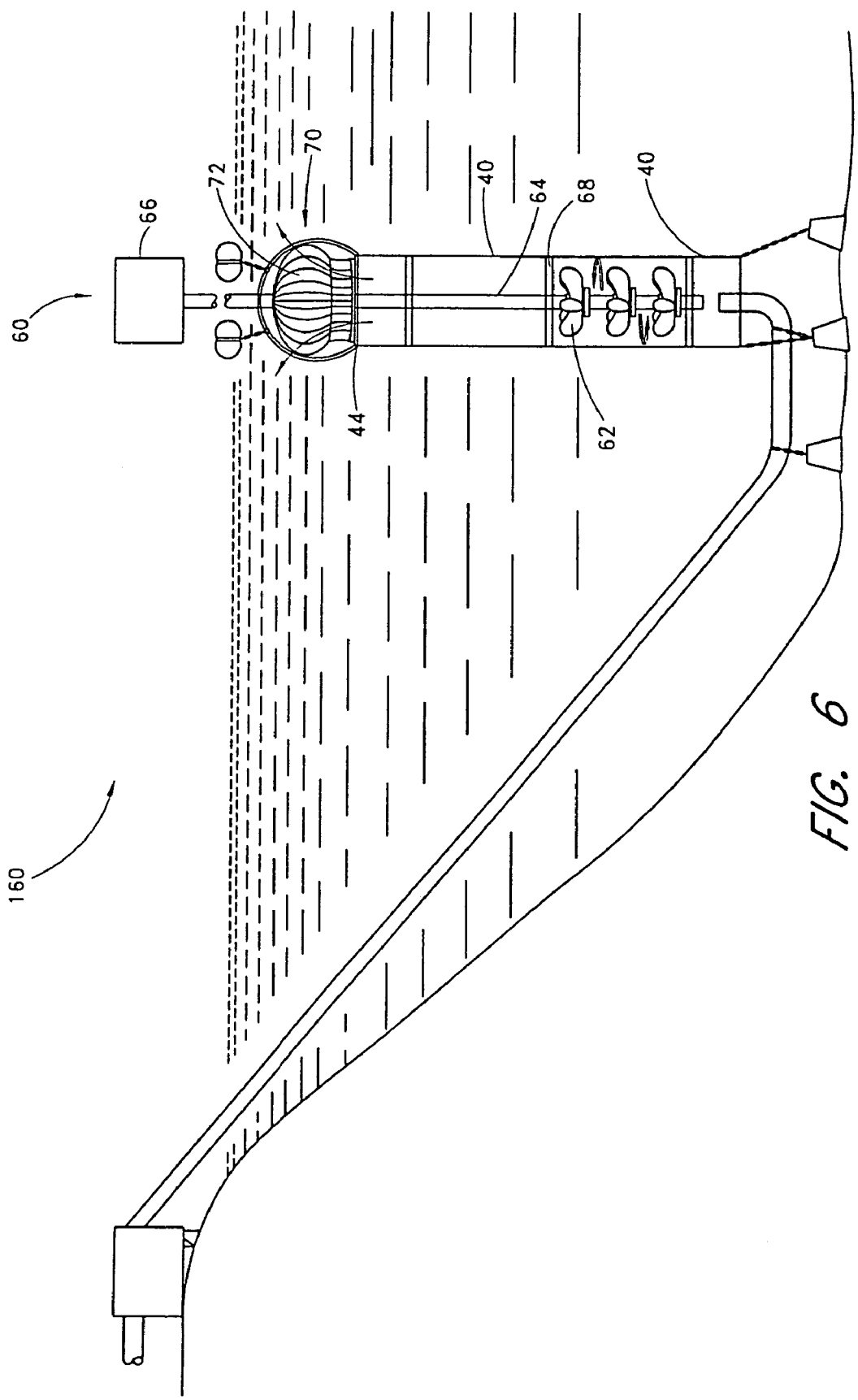
FIG. 6 is a schematic representation of a further alternative embodiment of a hydrocratic generator having features and advantages in accordance with the present invention.

FIG. 6 shows a further alternative embodiment of a power generator 60 in which one or more spiral fans 70 are mounted on the shaft 64. Shaft supports 68 may optionally be provided to minimize wobbling of the shaft 64. The one or more spiral fans 70 may be attached to the shaft 64 above the middle shaft support 68, below the middle shaft support 68, or both above and below the middle shaft support 68. One or more spiral fans 70 may be mounted on the shaft 64 on the outlet end 44 of the up tube 40. In an alternative embodiment, one or more spiral fans 70 may be mounted both inside the up tube 40 and on the outlet end 44 of the up tube 40. In the embodiment of FIG. 6, the spiral fan 70 is attached to the outlet end 44 of the up tube 40.

The spiral fan 70 comprises a plurality of spiral vanes 72. The water flow up the up tube 40 contacts the plurality of spiral vanes 72, turning the one or more spiral fans 70 mounted on the shaft 64. Turning the one or more spiral fans 70 rotates the shaft 64. The rotating shaft 64 drives the electrical generator 66, generating electrical power. Again, the electrical generator 66 may be conveniently located above or below the surface of the water, as desired.

In the embodiment of the power generator 60 shown in FIG. 6, both propellers 62 and one spiral fan 70 are mounted on the shaft 64. The propellers 62 and spiral fans 70 may be mounted on the shaft 64 in any order, above, below, or both above and below the middle shaft support 68. The propellers 62 and spiral fans 70 may also be mounted on the shaft 64 inside the up tube 40 and/or above the outlet end 44 of the up tube 40. In FIG. 6, propellers 62 are mounted on the shaft 64 inside the up tube 40 below the middle shaft support 68, and the single spiral fan 70 is mounted on the outlet end 44 of the up tube 40. The electrical generator 66 is located above the water.

FIG. 7A shows a further alternative embodiment of the up tube 40 in which the lower end 42 of the up tube 40 is closed. The down tube 20 passes through the closed lower end 42 of the up tube 40. Although FIG. 7A shows that the down tube 20 is attached to one or more mooring cables 52 which are attached to anchors 56 on the ocean floor, the down tube 20 may also be supported by the closed lower end 42 of the up tube 40. The closed lower end 42 of the up tube 40 of FIG. 7A helps to keep the down tube 20 in position without the need for mooring cables 52 and anchors 56.

The up tube 40 of the embodiment of FIG. 7A comprises a plurality of slots 76, as shown in FIG. 7B. The plurality of slots 76 are open to the surrounding sea and allow the sea water to enter the up tube 40. One or more shaft supports 68 are attached to the up tube 40. One possible embodiment of a suitable shaft support 68 is shown in FIG. 7C. The shaft support 68 comprises one or more hydrodynamic cross members 78 and a bearing 80. The cross members 78 are attached to the up tube 40 at a first end and to the bearing 80 at a second end, thereby suspending the bearing 80 inside the up tube 40. The bearing 80 can have a variety of designs such as ball bearings, compression bearings, and the like. The cross members 78 are preferably hydro-dynamically shaped so as to not slow down water flow in the up tube 40. The shaft support 68 supports the shaft 64, minimizing the wobbling of the shaft 64 when the shaft 64 rotates.

The power generator 60 of the embodiment shown in FIG. 7A comprises a vane drum 90 inside the up tube 40. The vane drum 90 comprises a plurality of rings 92 connected by a plurality of curved vanes 94. FIG. 7D shows a sectional view of the vane drum 90. Each curved vane 94 is attached by a first edge 96 to each of the plurality of rings 92. The curved vanes 94 are attached to the plurality of rings 92 in a manner so that the curved vanes 94 form a helical curve when viewed from the side, as shown in FIG. 7A. The helical curved shape of the curved vanes 94 improve the efficiency of energy transfer from the water flow through the slots 76 on the up tube 40 compared to the efficiency of curved vanes 94 which are not oriented with a helical curve. FIG. 7D shows the curved vanes 94 attached to the ring 92 from above as illustrated in FIG. 7A. FIG. 7D also shows the preferred curved surface of the curved vanes 94 as well as the helical orientation of the curved vanes 94 as viewed from above.

In one preferred embodiment, the vane drum 90 is attached to the shaft 64. When the sea water is drawn into the up tube 40 through the slots 76, the incoming water contacts the curved vanes 94, rotating the vane drum 90, which in turn rotates the shaft 64. The rotating shaft 64 turns the electrical generator 66, generating power from the upwelling water in the up tube 40.

FIG. 8A illustrates a further alternative embodiment of the power generator 60 comprising two vane drums 90, a first vane drum 90 below the middle shaft support 68 and a second vane drum 90 above the middle shaft support 68. In a preferred embodiment, both the first vane drum 90 and the second vane drum 90 are attached to the shaft 64 so that the shaft 64 rotates when the vane drums 90 rotate due to the flow of water through the slots 76 into the up tube 40. The rotating shaft 64 rotates the shaft of the electrical generator 66, generating electrical power.

In the embodiment of the up tube 40 shown in FIG. 8B, there are preferably two sets of slots 76 in the up tube 40 and two vane drums 90. In another embodiment, there are two vane drums 90 as in the embodiment shown in FIG. 8A, but the up tube 40 comprises only a single set of slots 76 in the up tube 40, as in the embodiment of the up tube 40 shown in FIG. 7B.

Figure 9B:
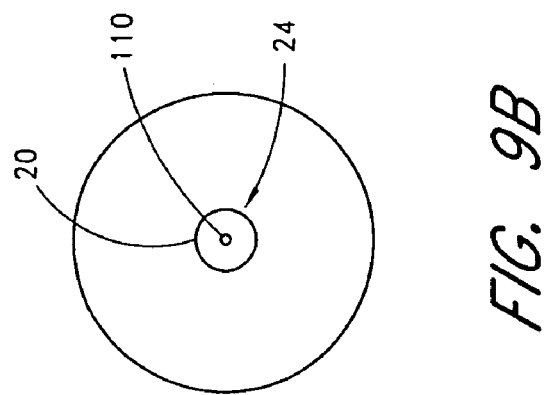
FIG. 9B is a sectional view from below of the up tube and the outlet end of the down tube of FIG. 9A.
Figure 9A:
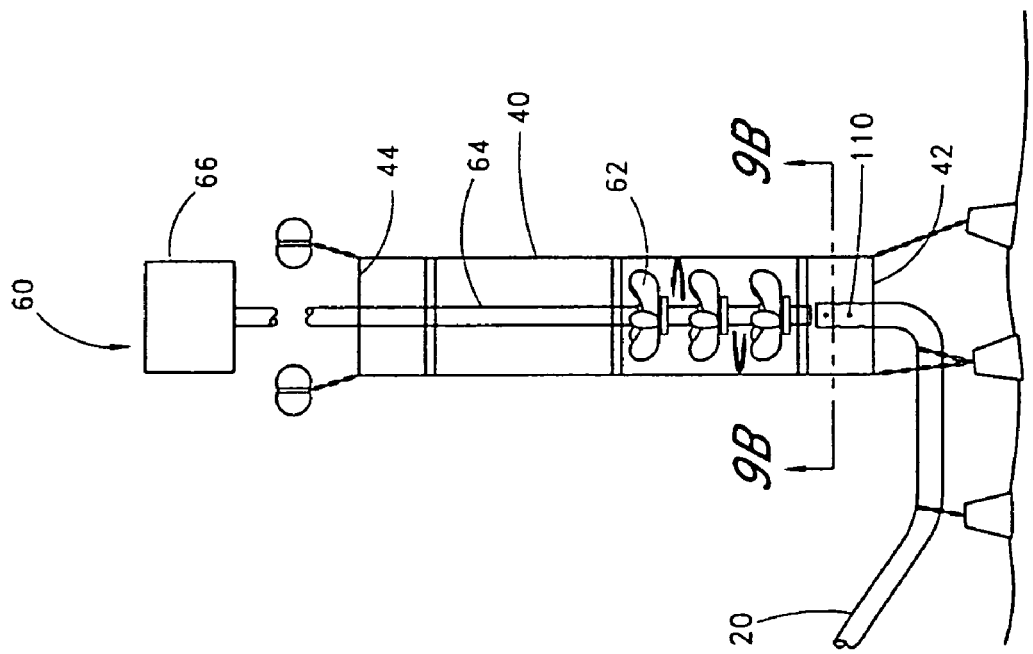
FIG. 9A is a schematic view of an up tube with an open lower end with an alternative embodiment of a down tube having a plurality of holes in the sides and the outlet end, having features and advantages in accordance with the present invention.

FIG. 9A shows an alternative embodiment of the down tube 20 in which a plurality of holes 110 are present in the side of the down tube 20. FIG. 9B shows a view of the outlet end 24 of the down tube 20 of FIG. 9A. The outlet end 24 of the down tube 20 of FIG. 9A is sealed except for a single hole 110. In alternative embodiments, a plurality of holes 110 may be provided in the outlet end 24 of the down tube 20. The fresh water flowing through the down tube 20 of FIG. 9A flows out of the plurality of holes 110 and into the up tube 40. Although the embodiment of the apparatus shown in FIG. 9A shows the alternative down tube 20 with the embodiment of the up tube 40 of FIGS. 4–6 with an open lower end 42, the down tube 20 of FIG. 9A may also be used with the embodiment of the up tube 40 such as shown in FIG. 7A or 8A with a closed lower end 42.

Figure 10B:
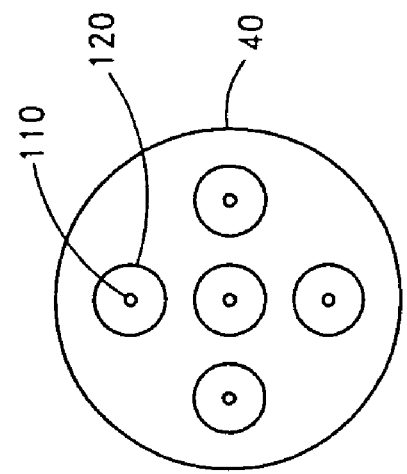
FIG. 10B is a sectional view from below of the up tube and the outlet end of the down tube of FIG. 10A showing the plurality of secondary down tubes and the holes on the outlet ends of the secondary down tubes.
Figure 10A:
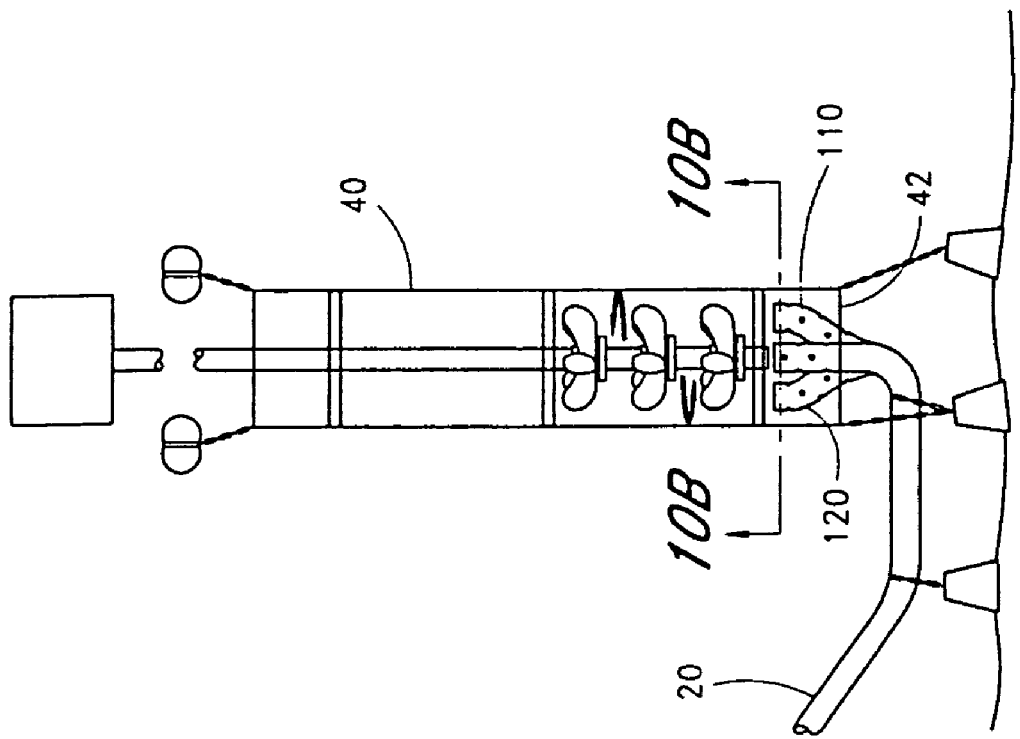
FIG. 10A is a schematic view of an up tube with an open lower end with an alternative embodiment of the down tube with a plurality of secondary down tubes having holes in the sides and the outlet end, having features and advantages in accordance with the present invention.

FIGS. 10A and 10B show another embodiment of the down tube 20 in which the down tube 20 separates into a plurality of secondary down tubes 120 In the embodiment shown in FIG. 10A, there are a plurality of holes 110 in the secondary down tubes 120, similar to the embodiment of the down tube 20 shown in FIG. 9A. FIG. 10B shows a sectional view of the down tube 20 of the embodiment of FIG. 10A from below. In the embodiment shown in FIG. 10B the outlet end 24 of each of the five secondary down tubes 120 is closed except for a single hole 110. In the embodiment of the down tube 20 of FIGS. 10A and 10B, the fresh water that is introduced into the down tube 20 exits the holes 110 to enter the up tube 40.

In other embodiments the down tube 20 may separate into a plurality of secondary down tubes 120, as in the embodiment of the down tube 20 of FIG. 10A, but there are no holes 110 in the secondary down tubes 120, and the outlet ends 24 of the secondary down tubes 120 are open. In this embodiment of the down tube 20 (not shown), the fresh water which is introduced into the down tube 20 exits the open outlet ends 24 of the secondary down tubes 120 to enter the up tube 40.

Figure 11:
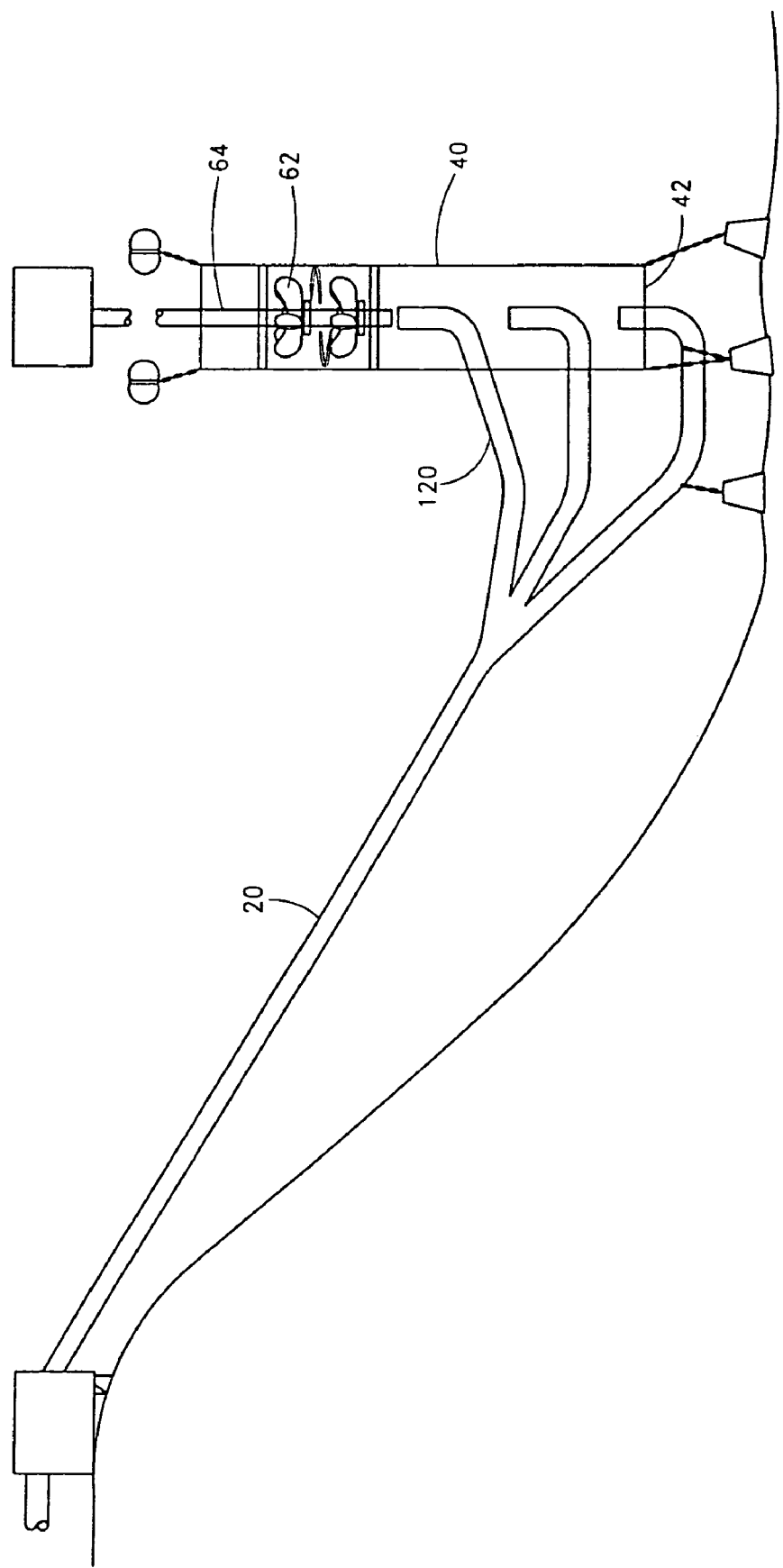
FIG. 11 is a schematic view of an up tube with an open lower end with an alternative embodiment of the down tube with a plurality of secondary down tubes, having features and advantages in accordance with the present invention.

FIG. 11 shows an alternative embodiment of the down tube 20 in which the down tube separates into a plurality of secondary down tubes 120. In the embodiment shown in FIG. 11, the down tube 20 separates into a plurality of secondary down tubes 120 outside of the up tube 40. In the embodiment shown in FIG. 11, there are no holes in the secondary down tubes 120, as in the embodiments shown in FIGS. 9A and 10A. In other embodiments there are a plurality of holes 110 in the secondary down tubes 120.

Although the embodiment of the apparatus shown in FIG. 11 shows the alternative down tube 20 with the embodiment of the up tube 40 of FIGS. 4–6 with an open lower end 42, the alternative down tube 20 of FIG. 11 may also be used with the embodiment of the up tube 40 such as shown in FIG. 7A or 8A with a closed lower end 42.

Figure 12:
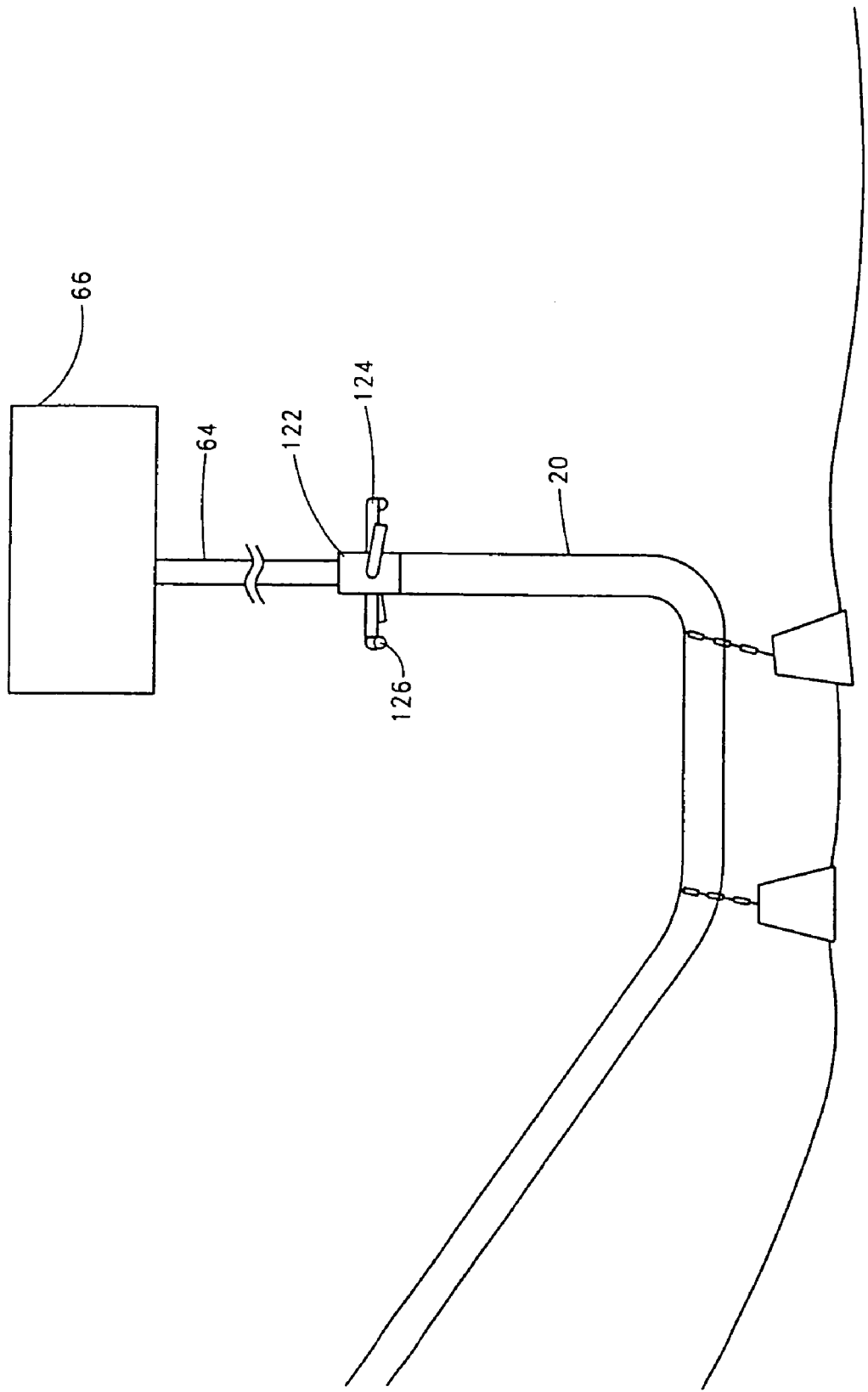
FIG. 12 is a schematic view of a down tube with a rotating hub and spoke outlets with no up tube.

FIG. 12 shows another embodiment of the down tube 20 in which the down tube 20 terminates in a hub 122. The hub 122 forms a cap on the down tube 20 and rotates freely on the down tube 20. A plurality of spoke outlets 124 are fluidly connected to the hub 122. The plurality of spoke outlets 124 emerge at approximately a right angle from the hub 124 and then bend at a second angle before terminating in a spoke discharge 126. The spoke discharge 126 may have an open end or a partially closed end where the water from the down tube 20 discharges. The embodiment of the down tube 20 shown in FIG. 12 is similar to a rotating lawn sprinkler. The hub 122 is attached to the shaft 64, which is in turn connected with the electrical generator 66. In the embodiment shown in FIG. 12, there is no up tube 40.

When fresh water flows through the down tube 20 and is discharged out of the spoke outlets 124, the hub 122, shaft 64, and electrical generator 66 rotate, generating electrical power. In the embodiment shown in FIG. 12, the energy generated by the electrical generator 66 comes almost exclusively from the kinetic energy from the water emerging from the plurality of spoke discharges 126, because there is no up tube 40 or means of generating power from hydrocratic energy generated from the mixing of fresh water from the down tube 20 with water of high salinity.

Figure 13:
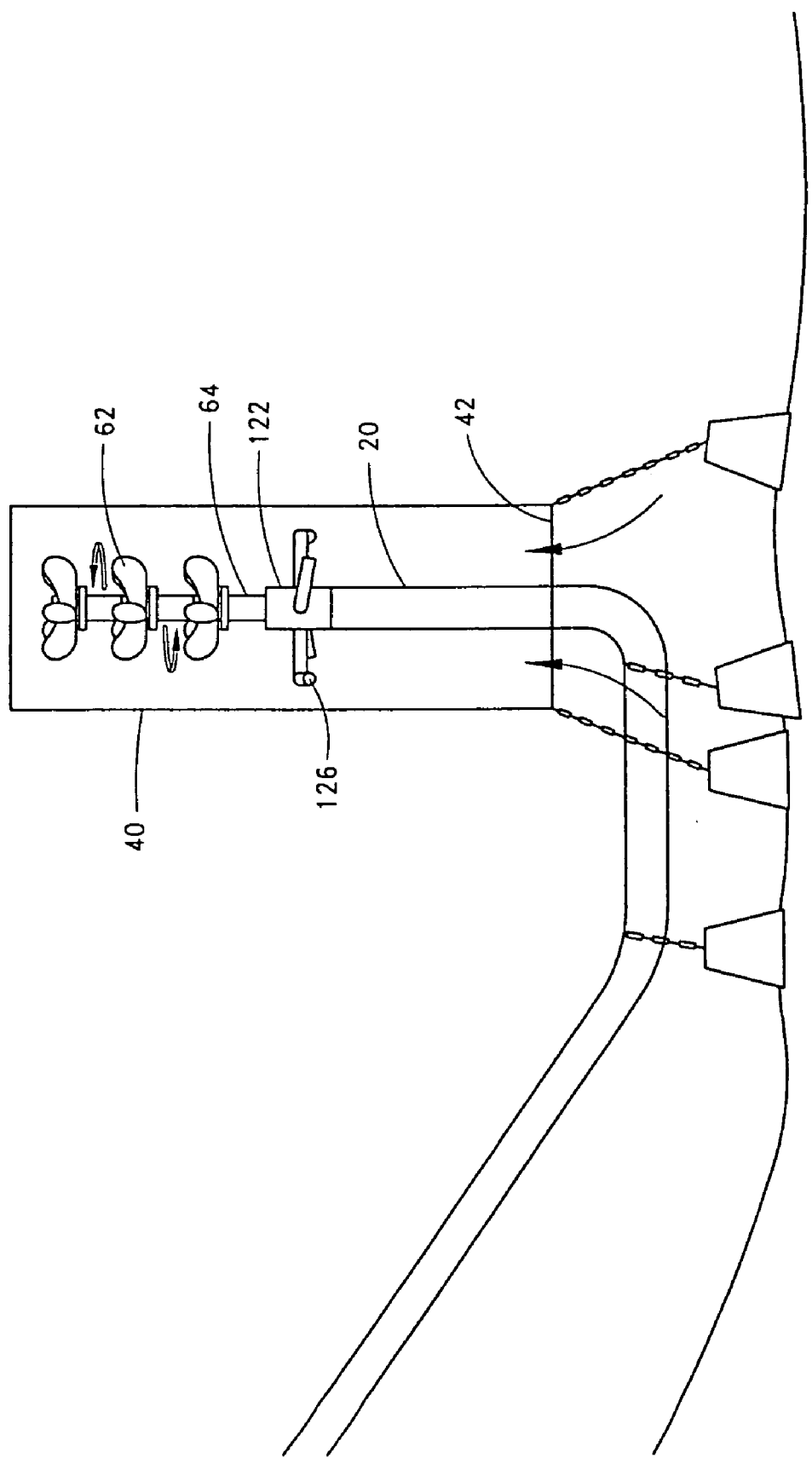
FIG. 13 is a schematic view of a down tube with a rotating hub and spoke outlets with an up tube, having features and advantages in accordance with the present invention.

FIG. 13 shows another embodiment of the down tube 20 similar to the embodiment of FIG. 12, with a hub 122, a plurality of spoke outlets 124, and a plurality of spoke discharges 126 at the ends of the spoke outlets 124. The embodiment of FIG. 13 differs from the embodiment of FIG. 12 in that the spoke discharges 126 discharge the fresh water from the down tube 20 into an up tube 40 with an open lower end 42 and a plurality of propellers 62 attached to the shaft 64. The fresh water which exits the spoke discharges 126 into the up tube 40 causes upwelling in the up tube 40, rotating the propellers, which in turn drive the shaft 64. The shaft 64 drives a electrical generator 66 (not shown), generating electrical power.

In the embodiment of the apparatus shown in FIG. 13, the shaft 64 is rotated both by the discharge of water from the spoke discharges 126 rotating the hub 122 and by the upwelling in the up tube 40 turning the propellers 62, which in turn rotate the shaft 64. The energy generated in the embodiment of the apparatus shown in FIG. 13 is therefore a combination of kinetic energy from the rotation of the hub 122, shaft 64, and electrical generator (not shown) from the fresh water ejected from the spoke discharges 126 and from hydrocratic energy generated from the upwelling in the up tube 40 from the mixing of fresh water from the spoke discharges 126 mixing with the water of high salinity entering the up tube 40 from the lower end 42.

Figure 14:
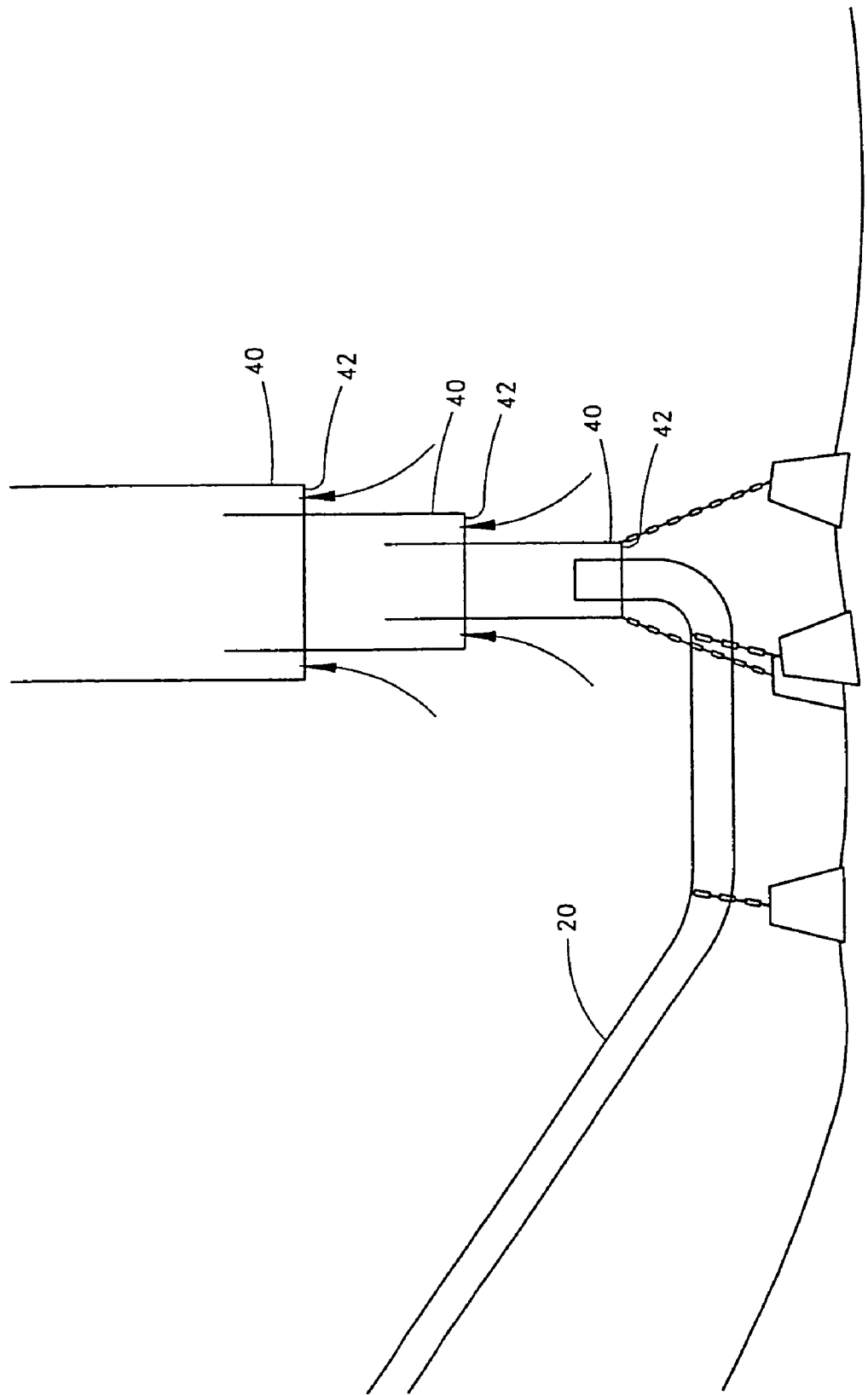
FIG. 14 is a schematic view of a portion of an up tube comprising a plurality of concentric up tubes, having features and advantages in accordance with the present invention.

FIG. 14 illustrates another embodiment of the up tube 40 in which there are a plurality of nested up tubes 40 having increasing diameters. The lower end 42 of each of the plurality of nested up tubes 40 is open. Fresh water is introduced into the down tube 20 causing upwelling in the plurality of up tubes 40 when the water of high salinity enters the open lower ends 42 of the nested up tubes 40.

Any of the embodiments of power generators 60 can be combined with the embodiment of the nested up tubes 40 of FIG. 14. For example, in one embodiment, the propellers 62 of FIGS. 4 and 5 may be used as a power generator 60 in combination with the nested up tubes 40 of FIG. 14. In another embodiment, the power generator 60 may comprise one or more spiral fans 70, as shown in FIG. 6.

Figure 15:
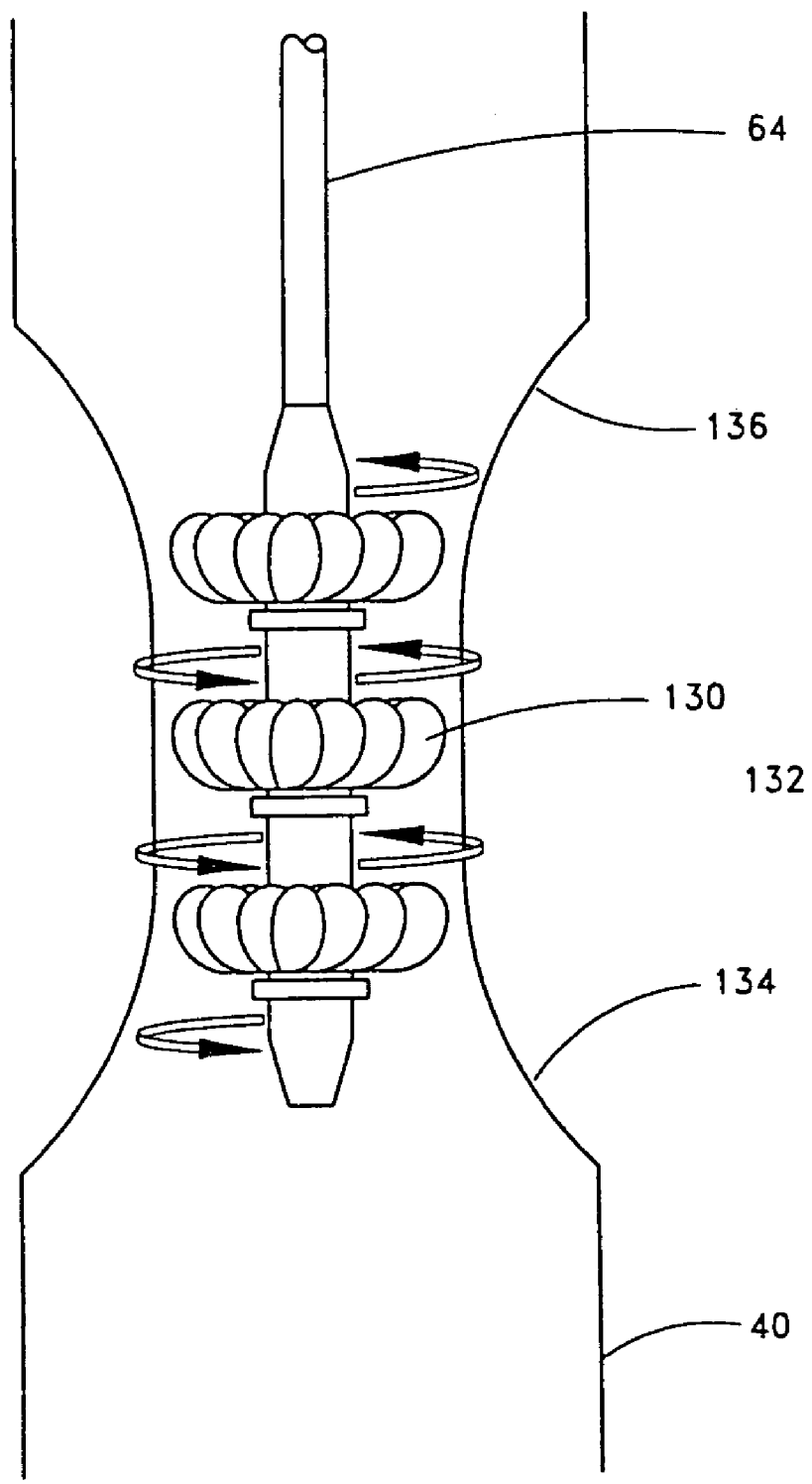
FIG. 15 is a schematic representation of a modified up tube having features and advantages in accordance with the present invention.

FIG. 15 shows another embodiment of the up tube 40 and power generator 60. In the embodiment of FIG. 15, a plurality of turbines 130 are mounted on a shaft 64 interspaced between a plurality of stators 132. The stators 132 direct the water flow into the turbine blades of the turbines 130 to increase the efficiency thereof. The shaft 64 is connected to an electrical generator 66 (not shown). When water upwells in the up tube 40, the upwelling water turns the turbines 130, which in turn rotate the shaft 64 and the electrical generator 66, generating power.

In the embodiment shown in FIG. 15, the portion of the up tube 40 surrounding the turbines 130 and stators 132 comprises a nozzle 134 and an expander 136. The nozzle 134 reduces the diameter of the up tube 40 in the portion of the up tube 40 around the turbines 130 and stators 132 from the diameter of the remainder of the up tube 40. By reducing the diameter of the up tube 40 with the nozzle 134 in the portion of the up tube 40 surrounding the turbines 130, the upwelling water is forced into a smaller area and is accelerated to a higher velocity water flow that can be harnessed more efficiently by the turbines 130. Nozzles 134 and stators 132 can also be used with other embodiments of the power generator 60 illustrated herein.

Figure 16:
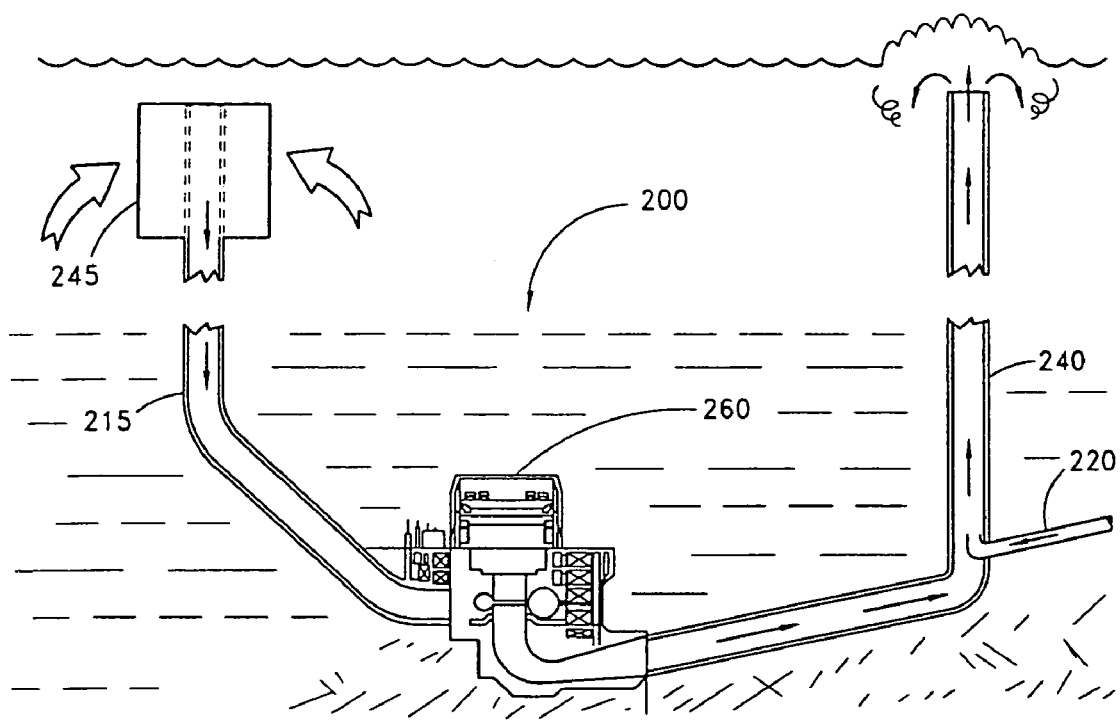
FIG. 16 is a schematic illustration of a possible large-scale commercial embodiment of a hydro-osmotic generator having features and advantages in accordance with the present invention.
Figure 17:
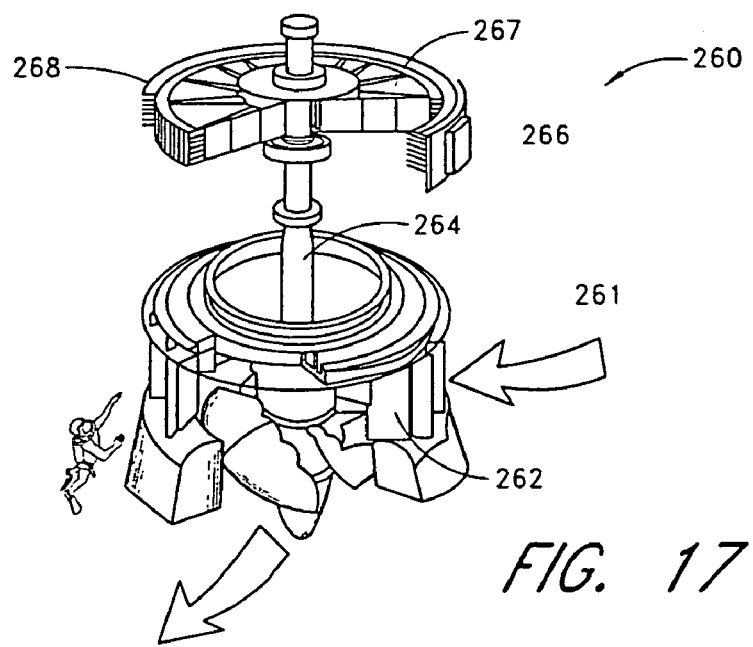
FIG. 17 is a cutaway view of the turbine and generator assembly of the hydro-osmotic generator of FIG. 12.

FIG. 16 is a schematic illustration of a possible large-scale commercial embodiment of a hydrocratic generator having features and advantages of the present invention. While a particular scale is not illustrated, those skilled in the art will recognize that the device 200 is advantageously suited for large-scale deep-water use 100–500 meters or more beneath sea level. The up tube 240 extends upward and terminates at any convenient point beneath sea level. The diameter of the up tube may be 3–20 meters or more, depending upon the desired capacity of the hydrocratic generator 200. This particular design is preferably adapted to minimize environmental impact and, therefore, does not result in upwelling of nutrient rich water from the ocean depths.

Sea water is admitted into the device from an elevated inlet tube 215 through a filter screen or grate 245. The filter removes sea life and/or other unwanted objects or debris that could otherwise adversely impact the operation of generator 200 or result in injury to local sea life population. If desired, the inlet tube 215 may be insulated in order to minimize heat loss of the siphoned-off surface waters to colder water at or near full ocean depth. Advantageously, this ensures that the temperature and, therefore, the density of the sea water drawn into the generator 200 is not too cold and dense to prevent or inhibit upwelling in the up tube 240.

The sea water is passed through a hydraulic turbine power plant 260 of the type used to generate hydraulic power at a typical hydro-electric facility. The turbine and generator assembly is illustrated in more detail in the cutaway view of FIG. 16. Water enters the turbine 261 through a series of louvers 262, called wicket gates, which are arranged in a ring around the turbine inlet. The amount of water entering the turbine 261 can be regulated by opening or closing the wicket gates 262 as required. This allows the operators to keep the turbine turning at a constant speed even under widely varying electrical loads and/or hydraulic flow rates. Maintaining precise speed is desirable since it is the rate of rotation which determines the frequency of the electricity produced.

As illustrated in FIG. 16, the turbine is coupled to an electric generator 266 by a long shaft 264. The generator 266 comprises a large, spinning "rotor" 267 and a stationary "stator" 268. The outer ring of the rotor 267 is made up of a series of copper wound iron cells or "poles" each of which acts as an electromagnet. The stator 268 is similarly comprised of a series of vertically oriented copper coils disposed in the slots of an iron core. As the rotor 267 spins, its magnetic field induces a current in the stator's windings thereby generating alternating current (AC) electricity.

Referring again to FIG. 16, the sea water is discharged from the turbine into the up tube 240. Fresh water is introduced into the base of the up tube 240 by down tube 220. The mixing of fresh water into saline sea water releases the hydrocratic or osmotic energy potential of the fresh water in accordance with the principles discussed above, resulting in a concomitant pressure drop (up to 190 meters of head) across the hydraulic turbine 260. This pressure drop in conjunction with the induced water flow upwelling through the up tube 240 allows for generation of significant hydro-power for commercial power production applications without adversely affecting surrounding marine culture.

Figure 18:
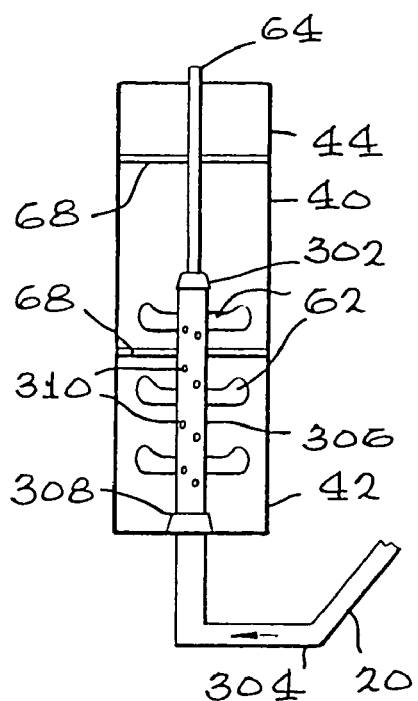
FIG. 18 is a schematic view of an up tube with an open lower end, with an alternative embodiment of the rotating down tube, extending substantially into the up tube, and having holes and turbines mounted thereon, having features and advantages in accordance with the present invention.

With reference to FIG. 18 of the drawings, this embodiment shows an up tube 40 having an open lower end 42 and an open outlet end 44. A down tube 20 is provided which enters the up tube 40 through the lower end 42, and extends to a point approximately midway along the length of the up tube, where it is sealed by a cap 302. A shaft 64 extends upwardly from the cap 302, extending to a generator, not shown in FIG. 18, but substantially similar to generators shown in some of the Figures described above.

Although in the embodiment shown in FIG. 18, the down tube 20 is shown as extending to a point approximately midway up the length of the up tube 40, this construction may, in practice, vary widely according to the conditions, length of the up tube 40, and other apparatus parameters. Thus, the down tube 20 may extend only a short distance into the up tube 40, or it may extend well beyond the midpoint thereof, to a selected height.

The down tube 20 comprises an outside portion 304, located outside of the up tube 40, and an inside portion 306, located within the up tube 40. The outside portion 304 and inside portion 306 of the down tube 20 are connected to each other by a rotational connector 308, which, in the embodiment shown in FIG. 18 is at the level of the open lower end 42. However, this rotational connector 308 could be configured on the down tube 20 at any appropriate vertical position of the down tube 20.

The rotational connector 308 permits rotation of the inside portion 306 relative to the outside portion 304, as will be described.

The inside portion 306 has a plurality of radial apertures 310, which may be randomly disposed on the inside portion 306, or specifically located, such as beneath a turbine 62, according to the selected configuration of the generator. Fresh water entering the down tube 20 from a supply source or reservoir passes through the rotational connector 308, and into the inside portion 306, where it must exit through one of the radial apertures. The cap 302 mounted at the top end of the inside portion 306 prevents any water or liquid from the down tube 20 from exiting the inside portion 306, except through the radial apertures 310.

The inside portion 306 and shaft 64 are secured appropriately in position by shaft supports 68 to prevent wobbling or axial displacement thereof, as has already been described above in other embodiments.

In operation, fresh water exiting the down pipe 20 through the radial apertures 310 is mixed with water of higher salinity entering the lower end 42 of the upper tube 40. The energy produced by the mixing of the water of higher salinity and lower salinity drives turbine 62, which in turn rotates the inside portion 306, the cap 302, and the shaft 64. This embodiment permits accurate selection of apertures 310 for releasing of the fresh water into the up tube 40, in a manner that is fixed with respect to the turbines 62. Since the radial apertures 310 and turbines 62 are both rotating, the precise location of mixing, and the optimal effect thereof of driving the turbine 62, can be exploited to improve the efficiency and hence the energy produced by the apparatus of the invention. This is achieved by the use of the rotational connector 308 which allows relative rotation of the inside portion 306, but ensures no leakage or fresh water escape from the down tube 20 at the position of the rotational connector 308.

Figure 19A:
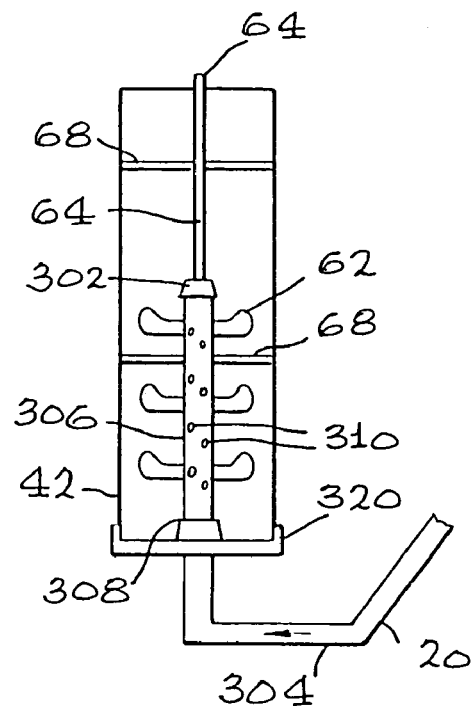
FIG. 19A is a schematic view of an up tube with a closed lower end, with an alternative embodiment of the rotating down tube, extending substantially into the up tube, and having holes and turbines mounted thereon, having features and advantages in accordance with the present invention.
Figure 19B:
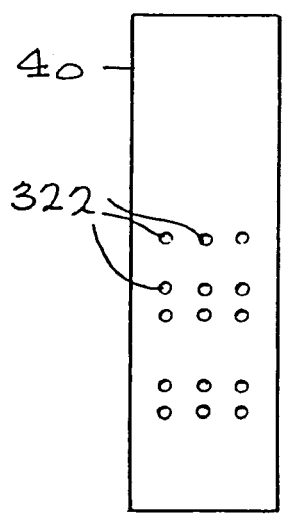
FIG. 19B is a side view of the up tube shown in FIG. 19A.

FIG. 19 shows a variation of the apparatus shown in FIG. 18, including the up tube 40, the down tube 20 having an outside portion 304, and an inside portion 306, the outside and inside portions 304 and 306 respectively being connected by the rotational connector 308. A cap 302 is provided at the top end of the inside portion 306, and a series of turbines 62 are mounted on the inside portion 306, which has a plurality of selectively placed radial apertures 310. The apparatus in FIG. 19 differs from the embodiment shown in FIG. 18 by the existence of a closure piece 320 over the lower end 42 of the up tube 40. Since the closure piece 320 prevents sea water from entering the lower end 42 of the up tube 40, a plurality of holes 322 are provided at locations in the wall of the up tube 40, as shown in FIG. 19B, through which the sea water is introduced to the interior of the up tube 40. One advantage of the embodiment shown in FIGS. 19A and 19B is that the sea water can be introduced at the most efficient point, thereby facilitating control of the precise points or areas at which the sea water as well as the fresh water are first introduced and allowed to mix. This factor, coupled with the orientation of turbines 62 on the inside portion 306, can be used to streamline the efficiency of the apparatus. As was the case with respect to FIG. 18, the fresh water is only allowed to exit through the radial apertures between the rotational connector 308 and the cap 302, at a position, flow-rate and orientation which can be controlled and manipulated to advantage.

Figure 20:
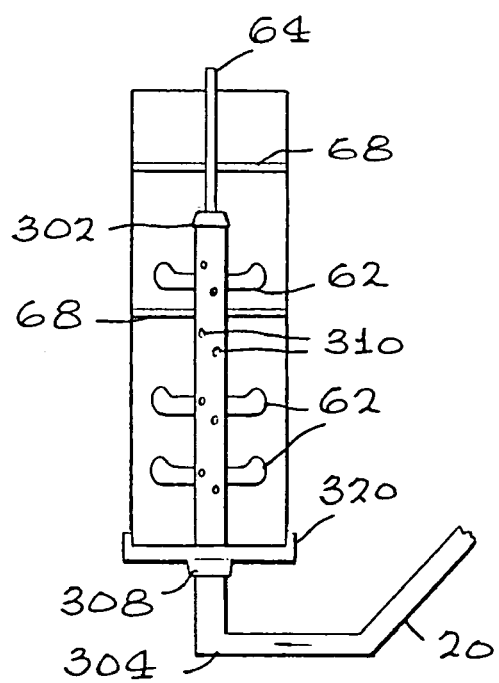
FIG. 20 is a schematic view of an up tube with an open lower end, with an alternative embodiment of the rotating down tube, extending substantially into the up tube, and having holes and turbines mounted thereon, with rotating up tube and down tube, having features and advantages in accordance with the present invention.

In FIG. 20 of the drawings, a further embodiment showing a variation of those illustrated in FIGS. 18 and 19 of the drawings is illustrated. In this embodiment, an up tube 40 is provided, as well as a down tube 20 including an outside portion 304, an inside portion 306 having a plurality of radial apertures 310, and a cap 302. At the lower end 42, a closure piece 320 is provided. In the embodiment shown in FIG. 20, the rotational device 308 is positioned outside of the up tube 40 and closure piece 320 so as to permit rotation of both the inside portion 306 of the down tube 40, and the up tube 20, in response to energy production which causes rotation of the turbine 62. Thus, rotation about the connector 308 as a result of forces on the turbines 62 thereby rotates the closure piece 320, up tube 40 and the inside portion 306 of the down tube 20.

As was the case in the embodiment shown in FIGS. 19A and 19B, sea water will enter the up tube 40, not through the lower end 42, but through a series of holes 322 of the type shown in FIG. 19B. Alternatively, instead of having a plurality of holes 322, one or more slits may be provided in the wall of the up tube 40, such as those shown in FIG. 7B or 8B of the drawings.

The embodiment of FIG. 20 is yet another variation by means of which the precise location of entry of the fresh water and sea water respectively into the up tube 40 can be controlled and exploited to derive maximum energy and power following hydrocrasis and the energy released thereby.

FIG. 21 of the drawings shows a variation of the hydrocratic generator of the invention which uses neither vanes nor turbines on the shaft 64, but rather a helical screw 330 mounted on the shaft, and which is caused to rotate in response to the energy released by mixing of the water with different salinities. Such forces acting on the helical screw 330 rotate the shaft 64, which in turn transmits rotational forces to the generator for use as described above.

FIG. 22A of the drawings shows an alternative embodiment for delivering fresh water from the down tube 20 to a precise location with respect to the fan blades. As shown in FIG. 22A, an inside portion 306 of the down tube 20 has a plurality of fan blades 62, also referred to as turbines, mounted thereon. Instead of exiting the inside portion 306 through a plurality of apertures, the fresh water in the inside portion 306 is fed through a fan tube 336 which is mounted on the underside 338 of the fan blade 62. Towards the outer extremity 340 of the fan blade 62, the fan tube 336 includes a U-shaped section 342, terminating in an outlet 344. Thus, fresh water enters through the inside portion 306, flows along the fan tube 336, into the U-shaped section 342, and exits through outlet 344. In the embodiment shown in FIGS. 22A and 22B, the fresh water thus flows from the interior pipe through a series of smaller pipes located under the fan blades 62 (or helical screw, if this embodiment is used), to the outer edge of the fan blades 62. The direction of flow is reversed so the fresh water exits in a flow direction which is towards the center of the up tube 40.

The embodiment shown in FIGS. 22A and 22B allows the apparatus to take advantage, once more, of controlling the exit areas for the saline and fresh water, thereby pinpointing the reaction location for maximum energy production and/or use of such energy in a manner which rotates the fan blades optimally. As with the other embodiments, the inside portion 306 of the down tube 20 is attached to a rotating shaft, which in turn attaches to a generator or power mechanism which uses or stores the energy so produced.

Figure 23:
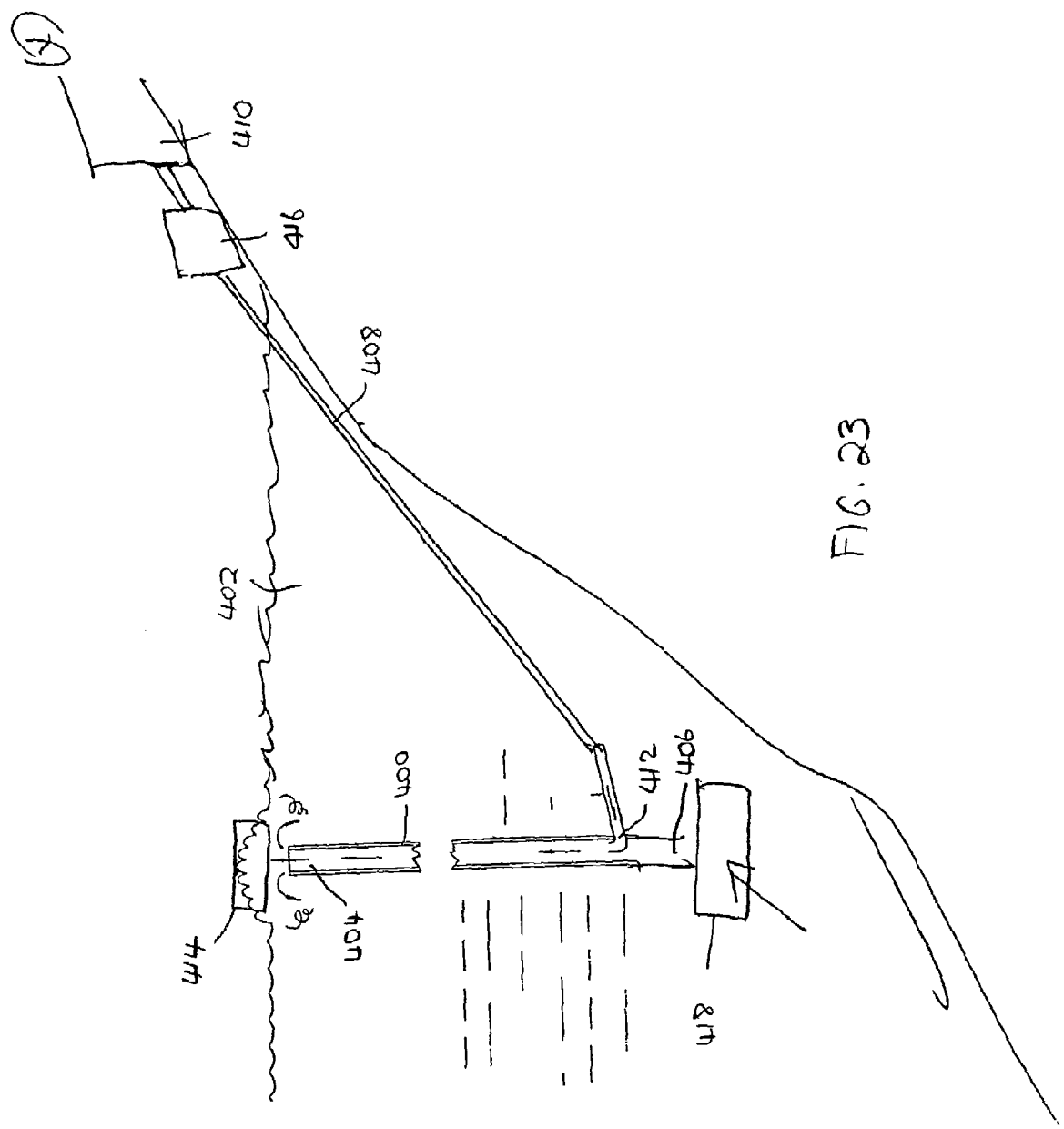
FIG. 23 is a schematic representation showing a further device of the invention, including multiple turbines.

Reference is now made to FIG. 23 of the drawings showing yet a further schematic representation of an embodiment of the invention. FIG. 23 shows some of the basic components only, and is mainly intended to illustrate the various locations and multiple turbines which may be used with the system. As such, only the basic apparatus is shown, but it may of course incorporate features and components as described in any one or more of the previous embodiments. This also applies to all embodiments described below.

In FIG. 23, the up tube 400 is positioned within a body of water 402, the up tube 400 having an upper end 404 and a lower end 406. Typically, the body of water 402 is the ocean, and water of relatively high humidity will enter the up-tube 400 through the lower end 406, and move towards the upper end 404. However, other models and variations are of course within the scope of this invention.

A down tube 408 is provided, and extends from a reservoir 410 at one end, with the other end 412 of the down pipe/tube discharging into the up tube 400 at or near the lower end 406. As has been described above, water from the reservoir 410 will have relatively low salinity, and mix with the relatively high salinity water entering through the lower end 406 of the up tube 400. As has already been described, the mixing of the relatively low and relatively high salinity water produces energy, and power generators are positioned to capture this energy. In FIG. 23, a first turbine 414 is provided near the upper end 404 of the up tube 400 to capture the energy and therefore generate power. It is to be noted that a second turbine 416 is positioned near the reservoir 410, along the down tube 408. Note that the second turbine 416 is shown near the reservoir 410 in FIG. 23, but it may be placed at other locations along the down tube 408. The flow of water through the down tube 408 drives the second turbine 412 and energy derived therefrom is used to produce power.

Additionally, a third turbine 418 is provided near the lower end 406 of the up tube 400. The third turbine 418 is positioned so as to take advantage of flow of water from the body of water 402 into the up tube 400, and capture and produce power.

Thus, it will be seen from FIG. 23 that various turbines may be placed around the system to take advantage of water flow not only as the result of the mixing of the relatively low and relatively high salinity water, but also to place turbines in other positions where they may be driven by the flow of water, either through the down tube 408, or upon entering or being driven through the up tube 400. Note that in FIG. 23, the second turbine 416 is shown outside of the body of water 402, although of course it can be placed at a lower level along the down tube 408, and may additionally or alternatively be located in the body of water 402.

Figure 24B:
Figure 24A:
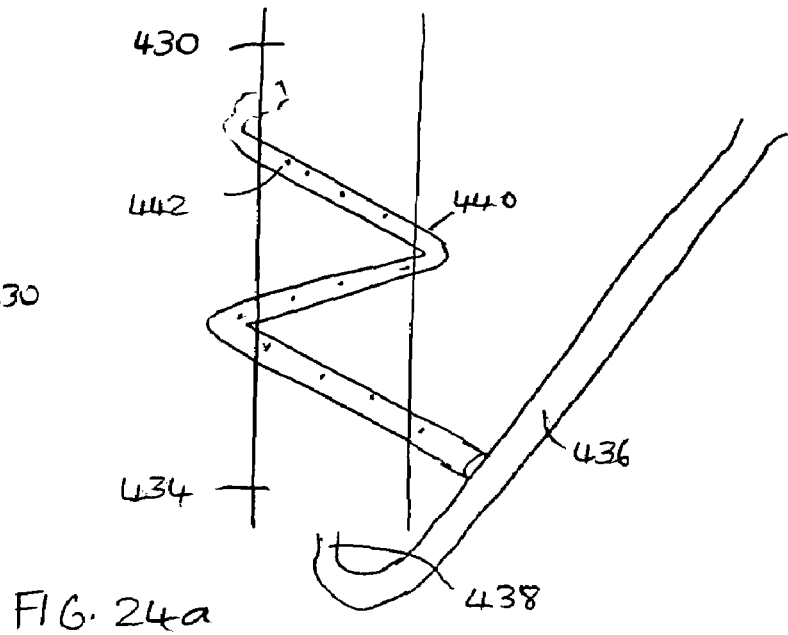
FIG. 24a is a schematic representation of yet a further embodiment of the invention, including a wrapped tube.

In FIG. 24a of the drawings, another mechanism whereby water may be introduced from a source of low salinity into the up tube is illustrated. Thus, in very schematic form, FIG. 24a shows an up tube 430, positioned substantially vertically, with an upper end 432 and a lower end 434, as has already been described. Water of relatively high salinity enters the lower end 434, passes into the up tube 430, and eventually is discharged through the upper end 432. While in the up tube 432, the relatively high salinity water is mixed with a relatively low salinity water delivered by a down pipe or tube 436. The down pipe 436 is connected to a source of relatively low salinity water, and extends to the lower end 434 of the up tube 430, and has a discharge opening 438 through which the relatively low salinity water is introduced into the up tube 430.

Further, the down pipe 436 has attached thereto a secondary down pipe 440 which leads off the down pipe 436 and is spirally or helically wrapped around the up tube 430. The secondary down pipe 440 has a plurality of holes 442 arranged along its length, and these holes register with corresponding holes in the up tube to permit water to pass from the secondary down pipe 440, through the up tube 430 and into the interior thereof. FIG. 24b shows a cross-section of the secondary pipe 440, wrapped around the up-tube 430, with the holes 442. In this embodiment, therefore, the relatively low salinity water, or fresh water, is introduced into the up-tube 430 not only at the low end 434 thereof, but also along multiple points of entry corresponding to the holes 442. This may facilitate mixing in a more thorough manner and may therefore also enhance the ability to capture additional power as a result thereof.

Figure 25:
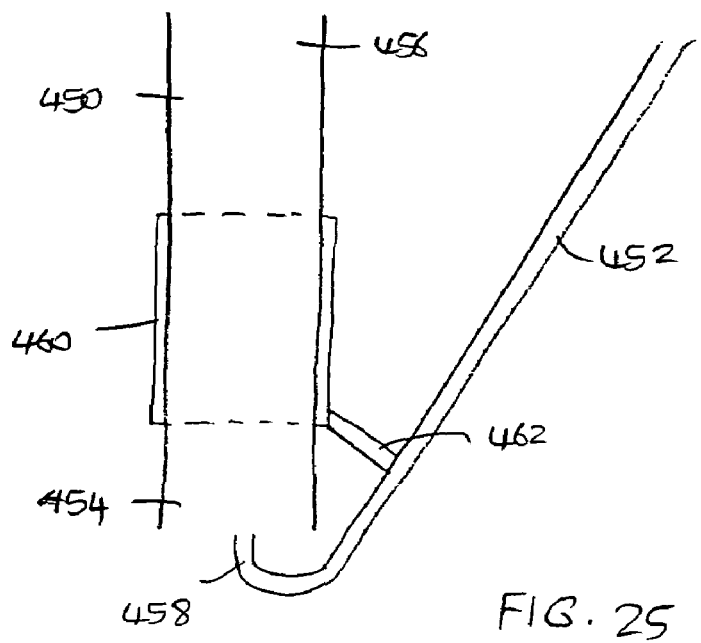
FIG. 25 is a schematic representation showing yet a further embodiment of the invention, including a sleeve tube.

Reference is now made to FIG. 25 which shows a further embodiment of the invention in schematic form. Once more, there is provided an up tube 450, and a down pipe 452. The up tube 450 has a lower end 454 and an upper end 456. The up tube 450 is located in a body of water, such as the ocean, and relatively high salinity water enters through the lower end 454, passes through the up tube 450 and is discharged through the upper end 456.

The down pipe 452 conveys water from a fresh water source, or water of relatively low salinity, or waste water which has been, or is to be treated, therethrough, and comprises the discharge opening 458 near the low end 454 of the up tube 450. Additionally, a sleeve 460 is formed around the up tube 450, and is supplied with water from the down pipe 452 through a branch pipe 462. The branch pipe 462 conveys water from the down pipe 452 to the inside of the sleeve 460, and holes in the up tube 450 allow water introduced into the sleeve 460 to enter the up tube 450 for mixing with the relatively high salinity water entering through the lower end 454. It will be appreciated that this embodiment shows a variation of that shown in FIG. 24a, providing additional points of entry of fresh water, or relatively low salinity water, to enhance mixing over a wider volume.

Figure 26:
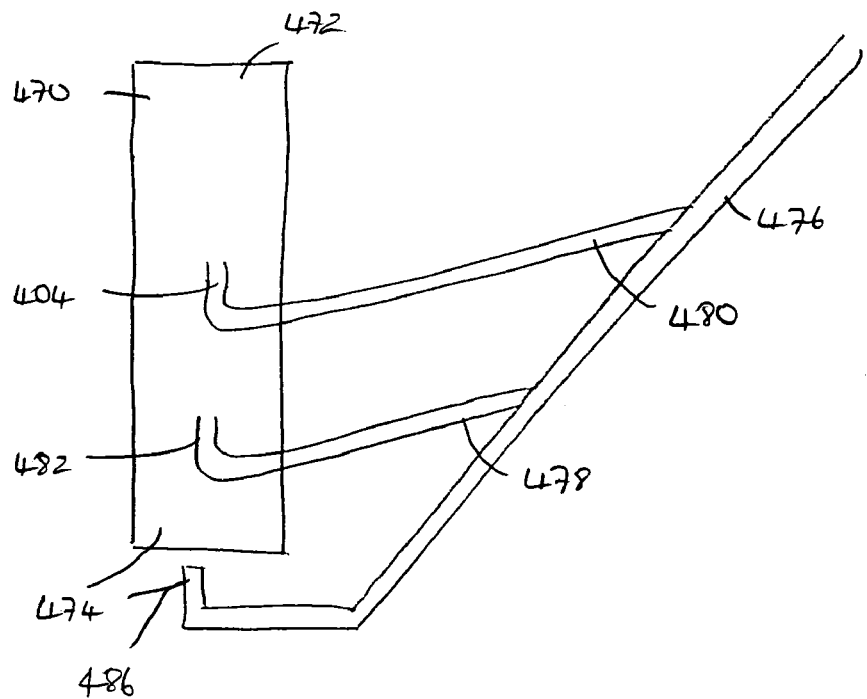
FIG. 26 is a schematic representation showing yet a further embodiment of the invention including a plurality of differently located feed tubes.

FIG. 26 illustrates a further embodiment of the invention in schematic form, and shows an up tube 470 having an upper end 472 and a lower end 474. A down pipe 476 conveys fluid of relatively low salinity into the lower end 474 of the up tube 470. Additionally, a first branch pipe 478 and a second branch pipe 480 branch from the down pipe 476, and have discharge outlets 482 and 484 respectively within the up tube 470. The down pipe 476 itself continues and has a discharge outlet 486 near the lower end 474 of the up tube 470. FIG. 26 illustrates an embodiment where fluid is delivered to the up tube 470 at several locations, once more, to facilitate mixing and to enhance the ability to capture additional power from the mixing process.

Figure 27B:
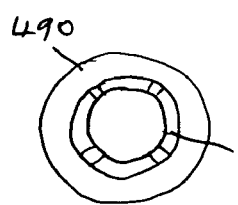
Figure 27A:
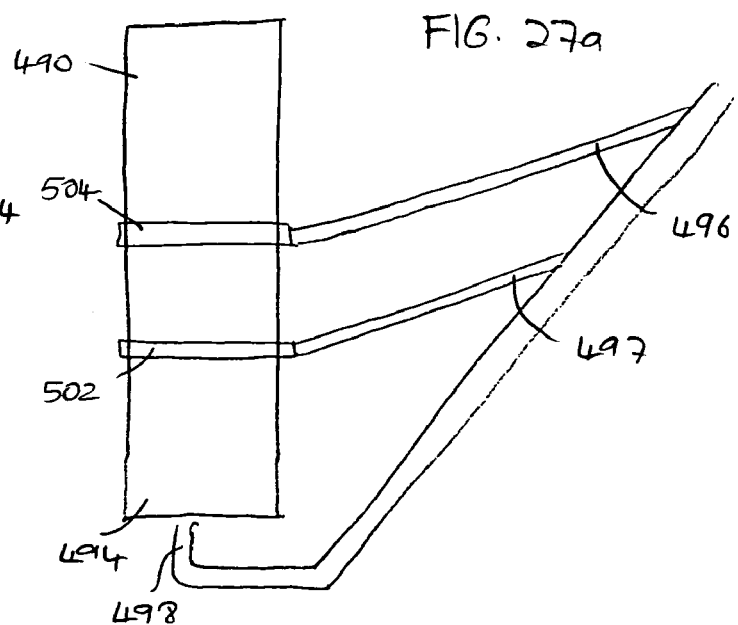
FIG. 27a is a schematic representation showing a further embodiment of the invention, including feed tubes incorporating rings.

In FIG. 27, an up tube 490 has an upper end 492 and a lower end 494. A down tube 496 extends from a source of relatively low salinity water, and has a discharge outlet 498 near the lower end 494 of the up tube 40. The down tube 496 also has a first branch pipe 497 and s second branch pipe 500 which respectively connect to a ring 502 and a ring 504 which circumnavigates the up tube 490 at various locations along its length. The first and second branch pipes 497 and 500 respectively deliver water or fluid to the rings 502 and 504 respectively, and the rings 502 and 504 have multiple holes therein through which water can pass to enter the up tube 490. FIG. 27b is cross-section through the up tube at the location of a ring, providing a further detail as to the configuration. Once more, this particular form of the invention allows a more diverse delivery of low salinity fluid into the up tube 490 to provide a more broad-based and effective mixing mechanism which in turn facilitates capturing of additional power from the mixing process.

Reference is now made to FIG. 28 of the drawings showing in schematic form yet another embodiment of the invention. In this particular embodiment, the hydrocratic generator of the invention is intended for use in conjunction with, for example, a sanitation district which may optionally incorporate a desalination plant. In FIG. 28, there is shown a body of water 520 having a water surface 522. Within the body of water 520, there is located a vertical or up tube 524 having an open upper end 526 and an open lower end 528. The up tube 524 is preferably located adjacent a land mass 530, which has built thereon various structures, including a sanitation district plant 532 and a desalination plant 534.

These two plants provide, respectively, fluid of relatively high salinity, and fluid of relatively low salinity, so that the mixing thereof within the vertical tube 524, along the lines described in the several embodiments above, produce energy which can be captured by a power generator for storage and subsequent use.

A sewer line 538 extends from the sanitation district plant 532, and has a discharge outlet 540 at or near the lower end 528 of the vertical tube 524. There is also a pipe or brine line 542 for transmitting fluid from the desalination plant to the inside of the up tube 524. Within the tube, the discharge contents from the sewer line 538, and the brine line 542, each of which has different relative salinity levels, results in a mixture which produces energy. A power generator, which may be in the form of a turbine, is not shown in FIG. 28 of the drawings, but may be positioned at or near the upper end 526 of the vertical tube 524, so as to capture the energy of the mixture. Additionally, turbines or power generators may be placed at other locations, such as in either one of the sewer line 538 or brine line 542.

As an alternative, the brine line 542 and sewer line 538 may be juxtaposed so that each discharges into the vertical tube in the reverse form as shown in FIG. 28. The lower end 528 of the vertical tube 524 is open, so that water from the body of water 520, such as an ocean, also enters the vertical tube.

In FIG. 28, the turbine or power generator may be above the upper end 526, outside of the vertical or up tube 524, or it may be at the level of the upper end 526 or even below it within the tube. Further, there may be more than one turbine or power generators arranged relative to the tube 524 so as to maximize the capture power in the most efficient manner to optimize energy produced by the mixing of the various fluids.

It should be noted that in all of the embodiments above, the relatively low salinity fluids and the relatively high salinity fluids may comprise fresh water and ocean water respectively, but the invention is certainly not limited to such an arrangement. In fact, the hydrocratic generator of the invention may be used in any situation which can exploit the energy produced by the mixing of relatively low salinity fluid and relatively high salinity fluid, irrespective of their nature. Thus, the fluid may be fresh water, ocean water, desalinated water, sanitation or waste water, or any other fluid, without limitation, the combination of which with one other such fluid will produce the necessary energy by virtue of mixing.

Other Applications/Embodiments

In the preferred embodiments discussed above, the up tube 40 is located in a body of water of high salinity and high negative osmotic potential such as an ocean or a sea. The water of high salinity and high negative osmotic potential enters the up tube 40 in a ratio of greater than 8:1 salt water to fresh water, more preferably 30:1 salt water to fresh water, and most preferably about 34:1 or higher. The mixing of the fresh water of low negative osmotic potential with the sea water of high negative osmotic potential in the up tube 40 causes upwelling and draws sea water into the up tube 40 through the openings. The upwelling water in the up tube 40 rotates propellers 62, spiral fans 70 or turbines 130, 261, which are attached to a drive shaft 64, 264. The rotating shaft 64, 264 turns the electrical generator 66, 266 generating electrical power from the difference in osmotic potential between the fresh water introduced into the down tube 20 and the water of high salinity which enters the up tube 40 through the openings in the up tube 40.

Because the method depends on having solutions of different osmotic potentials exiting the down tube 20 and entering the up tube 40, it is preferable that the source of fresh water exiting the down tube 20 and the source of the water of high salinity entering the up tube 40 continue to have different osmotic potentials over time so that power generation continues over a long period of time. For example, if the body of water of high salinity surrounding the up tube 40 is small, the fresh water exiting the down tube 20 can dilute the water of high salinity after exiting the up tube 40, reducing the difference in osmotic potential between the fresh water and the water of high salinity. Reducing the difference in osmotic potential between the fresh water exiting the down tube 20 and the water of high salinity entering the up tube 40 reduces the amount of energy available. It is therefore generally advantageous that the body of water of high salinity have a large volume. Locating the up tube 40 in a large body of water having high salinity such as the ocean or the Great Salt Lake is therefore a preferred embodiment.

Alternatively, the invention can be operated between bodies of salt water having different salinity or between waters at different depths of the same body of water. For example, the salinity and temperature of sea water is known to vary with depth and location. In the Hawaiian islands, at a depth of 1000 meters, the ambient water temperature is approximately 35° F., with a salinity of approximately 34.6 ppt. The surface temperature is approximately 80° F. with a salinity of approximately 35.5 ppt. Thus, an osmotic energy potential (albeit small) exists between the surface waters and the waters at 100 meters depth.

While the present invention is disclosed in the context of generating power by directly contacting and mixing fresh water with sea water in an apparatus located in the ocean, it is to be understood that the apparatus and method are not limited to this embodiment. The techniques and concepts taught herein are also applicable to a variety of other situations where aqueous solutions having differing osmotic potentials are available. For example, in one embodiment, the apparatus and method may be applied to a concentrated brine from a desalinization plant being mixed with the less-concentrated brine in sea water. In another embodiment, a treated sewage effluent, a fresh water stream, can be mixed with sea water. If desired, an osmotic membrane or osmotic water exchange plenum may be provided at the outlet end of the down tube and/or at the outlet (top) of the up tube in order to increase the efficiency of energy production. The apparatus and method may thus be applied to a wide range of applications in which two solutions of differing osmotic potential are available.

The various embodiments of the invention disclosed and described herein are exemplary only. As such, these example embodiments are not intended to be exhaustive of all possible ways of carrying out the invention or even the most economical or cost-efficient ways of carrying out the invention on a commercial scale. Many of the example embodiments disclosed and discussed herein are based on experimental testing of small-scale models embodying certain features of the invention. These models and the test results reported herein may or may not be directly relevant to a full-scale power production facility utilizing the invention. However, those skilled in the art will readily recognize from the examples disclosed and discussed herein the utility of the invention in terms of its broader scope, and how it may be beneficially utilized in a commercial power production facility to efficiently harness the osmotic energy potential between fresh water run-off and sea water (or other convenient bodies of water/solvent having different solute concentrations).

Thus, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Accordingly, it is intended that the scope of the present invention herein disclosed should not be limited by the particular disclosed embodiments described above, but should be determined only by a fair reading of the claims that follow.

The invention claimed is:

1. A mixing apparatus for mixing relatively low salinity fluid with relatively high salinity fluid, the mixing apparatus comprising:
   a housing having an upper end and a lower end, a fluid inlet at or near the lower end, and a fluid outlet at or near the upper end, wherein the relatively high salinity fluid in use enters the housing through the fluid inlet and is discharge from the housing through the fluid outlet;
   a feed tube having a first end connectable to a source of relatively low salinity fluid and second end for introducing relatively low salinity fluid to the housing to mix the relatively high salinity fluid with the relatively low salinity fluid to form a fluid mixture; and
   at least one power generator associated with the housing, the power generator being driven by the mixing of the relatively high salinity fluid with the relatively low salinity fluid.

2. A mixing apparatus as claimed in claim 1 wherein the housing comprises a substantially vertically oriented up tube.

3. A mixing apparatus as claimed in claim 2 wherein the down tube has a cross-sectional area and the up tube has a cross sectional area, and the cross sectional area of the down tube is 5–50,000 times smaller than the cross sectional area of the up tube.

4. A mixing apparatus as claimed in claim 2 wherein the down tube has a cross-sectional area and the up tube has a cross sectional area, and the cross sectional area of the down tube is 50–2,000 times smaller than the cross sectional area of the up tube.

5. A mixing apparatus as claimed in claim 1 wherein the power generator comprises a plurality of propellers and a shaft, the propellers being located in the housing, and an electrical generator coupled to the shaft for generating electrical power.

6. A mixing apparatus as claimed in claim 1 wherein the power generator comprises a vane drum having a plurality of vanes, wherein them plurality of vanes rotate a shaft when connected with the fluid mixture, and an electrical generator connected to the shaft.

7. A mixing apparatus as claimed in claim 1 wherein the relatively low salinity water is selected from the group consisting of fresh water, waste water, desalination water, or a mixture of one or more thereof.

8. A mixing apparatus as claimed in claim 1 wherein the high salinity water is selected from the group consisting ocean water, waste water, or a mixture thereof.

9. A mixing apparatus as claimed in claim 1 comprising a plurality of power generators.

10. A mixing apparatus as claimed in claim 9 comprising three power generators, comprising a first power generator positioned so that at least a portion of the relatively high salinity fluid which enters the housing flows therethrough, a second power generator positioned so that at least a portion of the relatively low salinity fluid in the feed tube flows therethrough, and a third power generator positioned so that at least a portion of the fluid mixture flows therethrough.

11. A mixing apparatus as claimed in claim 2 further comprising a secondary feed tube connected to the feed tube, the secondary feed tube forming a spiral about the up tube, the secondary feed tube having a plurality of apertures therein through which fluid can flow from the secondary feed tube, the up tube having a plurality of corresponding apertures for receiving fluid from the apertures in the secondary feed tube.

12. A mixing apparatus as claimed in claim 2 further comprising an annular sleeve located about at least a portion of the up tube, a secondary feed tube extending between the sleeve and the feed tube, and communication ports between the sleeve and the up tube for fluid flow.

13. A mixing apparatus as claimed in claim 1 further comprising a first branch feed tube and a second branch feed tube, the first and second branch feed tubes extending from the feed tube and positioned within the housing so as to discharge relatively low salinity fluid at different locations within the housing.

14. A mixing apparatus as claimed in claim 2 further comprising a first branch feed tube and a second branch feed tube, a first annular ring about the up tube, a second annular ring about the up tube, the first branch feed tube connecting to the first annular ring and the second branch feed tube connecting to the second annular ring, the first and second annular rings having communication ports with the inside of the up tube to permit relatively low salinity fluid to flow from the feed tube, through the first and second branch feed tubes and first and second annular rings respectively into the up tube.

15. A mixing apparatus as claimed in claim 1 wherein the housing is located in a body of water, a first fluid source for relatively high salinity fluid is located on an adjacent land mass, the feed tube extends from the first fluid source to the inside of the housing, a second fluid source of relatively low salinity fluid is located on the land mass, and a second fluid source feed tube extends between the second fluid source and the housing, the feed tube and the second fluid source feed tube for discharging fluid into the housing to enable mixing thereof to comprise at least a part of the fluid mixture.

16. A mixing apparatus as claimed in claim 15 wherein the first or second fluid source is a waste water disposal.

17. A mixing apparatus as claimed in claim 15 wherein the first or second fluid source is a sanitation plant.

18. A mixing apparatus as claimed in claim 15 wherein the first or second fluid source is a brine.

19. A mixing apparatus as claimed in claim 15 wherein the housing is located in a body of water whose salinity is less than the first fluid source and more than the second fluid source.

20. A method for generating power from the difference in osmotic potential between a source of relatively low salinity water and a source of relatively high salinity water, said method comprising:

locating a housing in a body of fluid, the housing having an upper end and a lower end, a fluid inlet at or near the lower end, and a fluid outlet at or near the upper end, wherein the relatively high salinity fluid enters the housing through the fluid inlet and is discharged from the housing through the fluid outlet;

connecting a feed tube by means of a first end thereof to a source of relatively low salinity fluid for conveyance of the fluid to a second end for introducing relatively low salinity fluid to the housing and mixing the relatively high salinity fluid with the relatively low salinity fluid to form a fluid mixture; and positioning at least one power generator at or near the housing, the power generator being driven by the mixing of the relatively high salinity fluid with the relatively low salinity fluid.

21. A method as claimed in claim 20 further comprising the step of locating a plurality of power generators to capture flow of water.

22. A method as claimed in claim 20 further comprising the step of introducing relatively low salinity fluid into the housing at multiple points.

23. The method as claimed in claim 20 wherein the mixture comprises relatively high salinity water and relatively low salinity water in a ratio of at least 8 to 1.

24. The method as claimed in claim 20 wherein the mixture comprises relatively high salinity water and relatively low salinity water in a ratio of at least 30 to 1.

* * * * *